United States Patent
Chhajer et al.

(10) Patent No.: US 12,348,431 B1
(45) Date of Patent: Jul. 1, 2025

(54) AUTOMATED SCALING OF PACKET PROCESSING SERVICE RESOURCES

(71) Applicant: Amazon Technologies, Inc., Seattle, WA (US)

(72) Inventors: Abhishek Chhajer, Seattle, WA (US); Sathish Bantwal Holla, Cedar Park, TX (US); Venkat Maithreya Paritala, Seattle, WA (US); Mayanka Pachaiyappa, Seattle, WA (US); Rajagopalan Madapusi Ammanur, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 18/323,369

(22) Filed: May 24, 2023

(51) Int. Cl.
*H04L 47/43* (2022.01)
*H04L 67/10* (2022.01)

(52) U.S. Cl.
CPC ............ *H04L 47/43* (2022.05); *H04L 67/10* (2013.01)

(58) Field of Classification Search
CPC ......... H04L 47/43; H04L 67/10; H04L 47/12; H04L 43/08; H04L 69/22; H04L 45/74
See application file for complete search history.

(56) References Cited

U.S. PATENT DOCUMENTS

| | | |
|---|---|---|
| 6,993,021 B1 | 1/2006 | Chuah et al. |
| 7,782,782 B1 | 8/2010 | Ferguson et al. |
| 7,865,586 B2 | 1/2011 | Cohn |
| 8,244,909 B1 | 8/2012 | Hanson et al. |
| 8,331,371 B2 | 12/2012 | Judge et al. |
| 8,358,658 B2 | 1/2013 | Flynn et al. |
| 8,478,896 B2 | 7/2013 | Ehlers |
| 8,693,470 B1 | 4/2014 | Maxwell et al. |
| 10,742,446 B2 | 8/2020 | Tillotson et al. |
| 10,757,009 B2 | 8/2020 | Deb et al. |
| 10,785,146 B2 | 9/2020 | Tillotson et al. |
| 10,797,989 B2 | 10/2020 | Tillotson et al. |
| 10,834,044 B2 | 11/2020 | Tillotson et al. |
| 10,893,004 B2 | 1/2021 | Tillotson et al. |
| 10,897,417 B2 | 1/2021 | Tillotson et al. |
| 11,310,155 B1 | 4/2022 | Qian et al. |

(Continued)

OTHER PUBLICATIONS

"Albert Greenberg, et al ""VL2: A Scalable and Flexible Data Center Network"" Communications of the ACM, vol. 54, No. 3, Mar. 2011, pp. 1-10".

(Continued)

*Primary Examiner* — Cheikh T Ndiaye
(74) *Attorney, Agent, or Firm* — Robert C. Kowert; Kowert, Hood, Munyon, Rankin & Goetzel, P.C.

(57) ABSTRACT

A virtual network interface is configured to receive packets of an application at a packet processing service. A first set of fast-path nodes of the service is assigned to execute packet rewriting rules on packets received via the virtual network interface. Based on analysis of metrics obtained from the set of fast-path nodes, a determination is made that a criterion for scaling up fast-path nodes has been met. A second set of fast-path nodes is assigned to execute packet rewriting rules on additional packets received via the interface, with the number of nodes included in the second set based on a statistic (indicated by the metrics) of the size of packets transmitted via the virtual network interface.

20 Claims, 11 Drawing Sheets

(56) References Cited

U.S. PATENT DOCUMENTS

| | | | |
|---|---|---|---|
| 11,353,855 B1 | 6/2022 | Hahn et al. | |
| 11,469,998 B2 | 10/2022 | Sanghvi | |
| 11,500,837 B1 | 11/2022 | Reaz et al. | |
| 11,601,365 B2 | 3/2023 | Qian et al. | |
| 11,665,090 B1 | 5/2023 | Banerjee et al. | |
| 11,799,950 B1 | 10/2023 | Banerjee et al. | |
| 2008/0002579 A1* | 1/2008 | Lindholm | H04L 47/10 370/230 |
| 2008/0225875 A1* | 9/2008 | Wray | H04L 12/4633 370/419 |
| 2012/0089032 A1* | 4/2012 | Park | A61B 5/361 600/484 |
| 2021/0044512 A1* | 2/2021 | Deb | H04L 45/04 |
| 2022/0292184 A1* | 9/2022 | Pope | H04L 63/0218 |
| 2022/0321469 A1 | 10/2022 | Qian et al. | |
| 2022/0321471 A1 | 10/2022 | Qian et al. | |

OTHER PUBLICATIONS

"Chuanxiong Guo, et al ""BCube: A High Performance, Server-centric Network Architecture for Modular Data Centers"" SIGCOMM'09 Aug. 17-21, pp. 1-12".

"On the Impact of Packet Spraying in Data Center Networks", Advait Dixit, et al., 2013, pp. 1-9.

U.S. Appl. No. 17/706,495, filed Mar. 28, 2022, Sujogya Banerjee, et al.

U.S. Appl. No. 17/706,511, filed Mar. 28, 2022, Sujogya Banerjee, et al.

U.S. Appl. No. 16/711,255, filed Dec. 11, 2019, Daniel Voinea, et al.

U.S. Appl. No. 16/843,807, filed Apr. 8, 2020, Oron Anschel, et al.

U.S. Appl. No. 17/385,778, filed Jul. 26, 2021, Meher Aditya Kumar Addepali.

U.S. Appl. No. 18/189,157, filed Mar. 23, 2023, Sujogya Banerjee, et al.

* cited by examiner

AUTOMATED SCALING OF PACKET PROCESSING SERVICE RESOURCES

BACKGROUND

As demand for virtualization-based services at cloud provider networks has grown, more and more networking and interconnectivity-related features have been added to the services. Many such features may require network packet address manipulation in one form or another, e.g., at level 3 or level 4 of the open systems interconnection stack. For example, some providers configure groups of resources as isolated virtual networks on behalf of respective customers, with substantial flexibility being provided to the customers with respect to the networking configuration details within their particular subsets of the provider network resources. As customers may assign IP (Internet Protocol) addresses within their isolated virtual networks independently of the addresses assigned at other isolated virtual networks, managing traffic in and out of the isolated virtual networks may require the use of address translation techniques. Using ad-hoc solutions for all the different types of packet transformation requirements may not scale in large provider networks at which the traffic associated with hundreds of thousands of virtual or physical machines may be processed concurrently. At some applications requiring packet processing, the workload may vary significantly over time.

Figure 1:
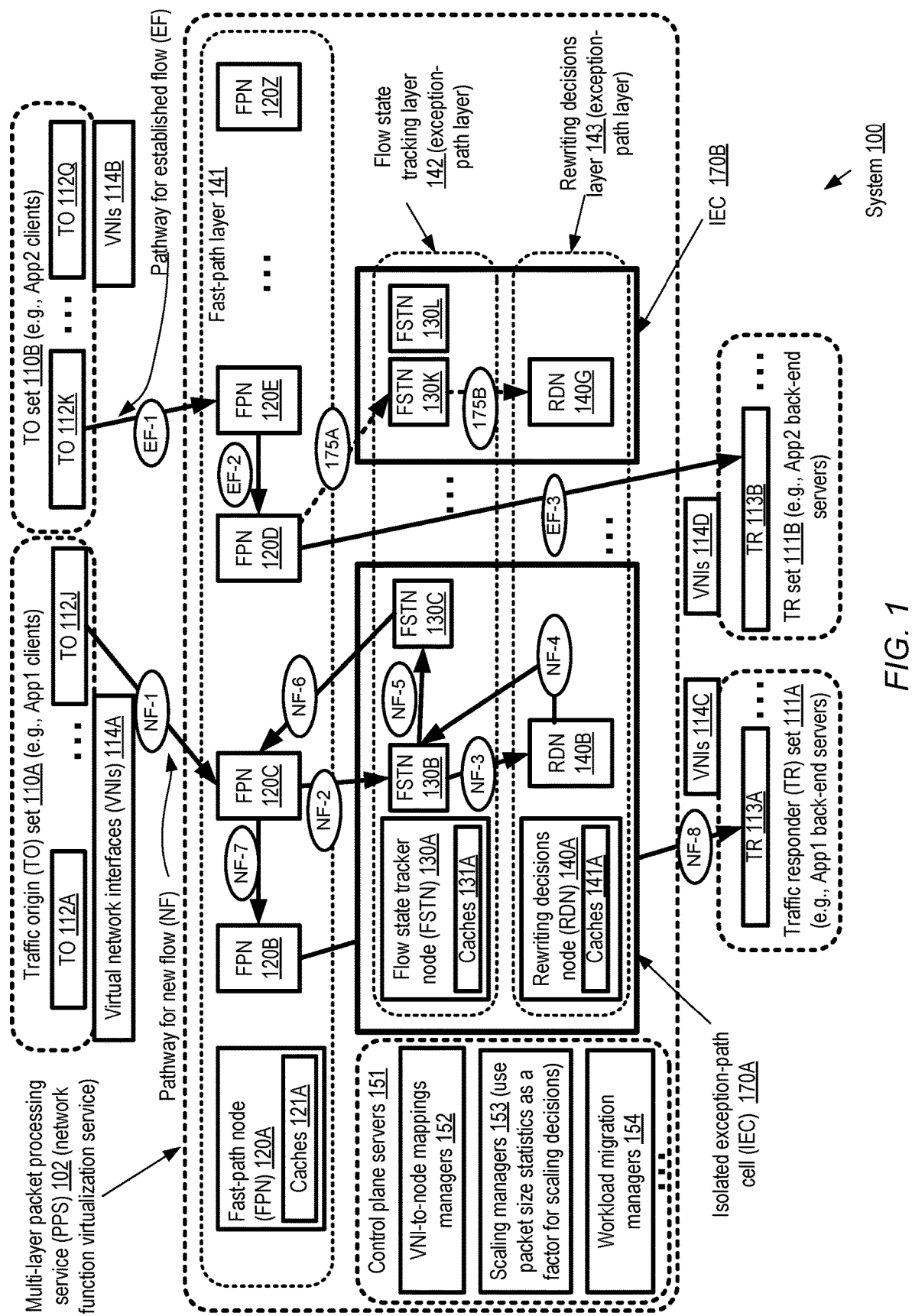
FIG. 1 illustrates an example system environment in which techniques for per-virtual network interface scaling of nodes of a packet processing service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for automating the scaling of a packet processing service, taking packet sizes into account along with other factors. Packet processing service resources are traditionally scaled based on throughput considerations. The throughput measured for traffic of a particular customer (e.g., traffic received via a particular virtual network interface assigned to the customer) is passed to administrative or control plane components of the service, which can then use the throughput measurements to decide whether addition nodes of the service should be configured for that customer. However, higher throughput can be handled at a given set of nodes for larger packets (e.g., Jumbo Ethernet frames larger than the traditional default limit of 1500 bytes) than for smaller packets. The techniques described herein allow packet processing services to make scaling decisions based not just in throughout, but also on statistics on the sizes of the packets. This can increase the efficiency of the packet processing resource fleet substantially-that is, fewer nodes can be configured to handle the same throughput.

A multi-layer packet processing service (PPS) of a cloud provider network or cloud computing environment can be used to rewrite network packets (e.g., by substituting or adding header fields) of various kinds of applications implemented at least in part at the provider network according to requirements specified by the application owners. Packet rewriting rules generated and applied by the PPS enable, for example, service requests generated by application clients to be delivered efficiently to the appropriate servers (even though the clients may not be aware of the actual network addresses of the servers in the virtualized computing environment of the cloud) and responses to the application requests to be delivered efficiently to the clients. A PPS can also be referred to as a network function virtualization service (NFVS) or a virtualized network function service (VNFS), as the packet rewriting rules are examples of virtualized network functions which can be combined into pipelines or graphs implementing various types of applications.

The resources of a PPS can include nodes arranged in three layers: a fast-path layer, a flow state tracking layer and a rewriting decisions layer. The flow state tracking layer and the rewriting decisions layer are collectively referred to as exception-path layers, responsible for generating packet rewriting rules based on application requirements, and for maintaining state information for various packet flows being handled at the service. The fast-path layer nodes (FPNs) can query the exception-path layer nodes (EPNs) for rewriting rules when the first packet of a flow is received, store the rewriting rules in local caches, and re-use the rules for rapidly rewriting/transforming subsequent packets of the flow before transmitting them to their intended destinations. Under normal operating conditions, an FPN can quickly use cached rewriting rules to process the vast majority of received packets of a flow, and only interacts with EPNs infrequently; hence the use of the terms "fast-path" and "exception-path" to describe the layers.

For a given networking application which utilizes the PPS, at least one virtual network interface (VNI) can be assigned for funneling traffic to/from the PPS. A VNI is a logical entity with a set of networking and security-related attributes that can be programmatically attached to (or detached from) a compute instance or networking constructs such as logical load balancers or gateways. For example, at least one IP address can be assigned to a given VNI VNI1, and security rules restricting inbound and outbound traffic may be set for VNI1. A group of FPNs and a group of EPNs can be assigned initially for a given VNI of a given networking application by control plane servers (CPSs) of the PPS, e.g., with the number of nodes of each type selected based on expected workload levels indicated in an application descriptor provided by the application's owner or administrator via programmatic interfaces. The FPNs and/or the EPNs can (at least by default) be configured in multi-tenant mode; that is, a given FPN or a given EPN can initially be configured to process packets of multiple applications, received at the PPS via respective VNIs. An FPN and/or an EPN can comprise one or more processes or threads running at a virtual machine or compute instance of a virtualized computing service (VCS) of a cloud computing environment, or can be implemented using non-virtualized servers. In some scenarios in which a VCS is used, several different categories of compute instances may be offered by the VCS, with respective categories differing from one another in performance capacity and/or other characteristics. In such scenarios, different categories of compute instances can be selected by the CPS for a given application's FPNs and/or EPNs based on factors such as expected bandwidth and packet flow rates.

The packet processing workload of a given networking application can vary substantially over time. For example, the rate at which application data packets are received at the PPS (expressed in units such as packets per second), the network bandwidth consumed by the application data packets (expressed for example in gigabits per second or Gbps), the rate at which new connections are established between the traffic sources of the applications and the PPS, the sizes of the payloads of the packets, and/or other metrics can all vary. For some applications, the required bandwidth and/or packet transmission rate may increase substantially from a baseline level (e.g., a workload level for which the initial groups of FPNs and EPNs were selected) for some time period, and eventually decrease again. Such temporary increases followed by corresponding decreases can occur, for example, at networking applications that are used to manage e-retail web sites at which end user demand peaks during (or shortly before) holiday periods. For other applications, workload can continue to increase over time, without reverting close to the baseline or nominal level.

CPSs of the PPS can automatically modify resource allocations (e.g., the number of FPNs or EPNs, and/or the category of compute instance used for the FPNs or EPNs) in response to such changes in workload levels. Such modifications can be made, for example, by the CPSs based on detected trends in metrics collected from the PPS nodes. Based on analysis of metrics associated with a given VNI VNI1 assigned to an application App1, collected over a selected time interval from a set of multi-tenant FPNs assigned to VNI1, for example, a CPS can determine that a criterion for scaling up FPNs (and thereby increasing the capacity for executing rewriting rules of App1) has been satisfied. Metrics collected from the FPNs about traffic associated with other VNIs of other applications (to which some of the FPNs were also assigned in accordance with the multi-tenancy approach implemented at the PPS) may indicate that scale up is not required for other VNIs—that is scaling decisions can be made on a per-VNI level by the CPSs. The CPSs can determine a number of FPNs that should be assigned (e.g., in single-tenant mode, such that the newly-assigned FPNs are used only for the VNI VNI1 whose traffic met the scale up criterion) to VNI1 and App1. Various factors can be used by the CPS for selecting the number of FPNs for scaling up App1, including for example the rate at which the bandwidth usage or packet rate of App1 has increased, statistics on the sizes of the packets (such as the average size of the packets) transmitted for App1, and so on. The sizes of the packets can have a significant bearing on the bandwidth that can be sustained at an FPN in some cases, and can therefore strongly influence the number of FPNs that should be used to support increases in App1 workload.

The selected number of FPNs can then be assigned and activated to receive packets, and the traffic of App1 can be transitioned to the newly-assigned FPNs. For example, after the FPNs are assigned, the CPS can make configuration changes at VNI1 and/or at EPNs assigned to App1 to cause packet rewriting rules of App1 to be executed for subsequent packet flows of App1 at the new FPNs instead of at the original set of FPNs. Traffic of other applications and other VNIs, which was being processed at the original group of multi-tenant FPNs, can continue to be processed there.

Analysis of the collected metrics by the CPS can sometimes indicate (e.g., based on increases in connection establishment rates of App1) that the number of EPNs assigned to App1 should also be increased. The set of factors that influence EPN scaling can differ from the set of factors that influences FPN scaling—for example, since EPNs are utilized most heavily when the first packet of a new connection or flow is received (which is the time at which a new packet rewriting rule is needed by the FPNs for the new flow), and are utilized less for subsequent packets (after the rewriting rule has been generated at the EPNs and is cached at the FPNs), the role of connection establishment rates can be more influential for EPN scaling decisions than bandwidth increases, overall packet rate increases and/or packet size. If a CPS determines that additional EPNs are needed for the traffic of VNI1/App1, the number of additional EPNs to be assigned can be chosen based on the collected metrics, and new EPNs can accordingly be configured.

If the workload of App1 decreases in a sustained manner, in some cases a CPS can scale down (reduce) the capacity assigned to App1 at the FPN layer and/or the EPN layers. If, based on the increase in workload, the CPS had chosen to transition App1 from multi-tenant FPNs to single-tenant FPNs, the CPS can revert to using multi-tenant FPNs if the workload decreases. Similar tenancy decisions can be made regarding EPNs as well.

In some cases, multiple VNIs can be assigned to a given networking application, e.g., with one VNI being used for receiving packets, and another VNI being used for sending rewritten packets. In scenarios in which a single VNI is assigned to receive traffic of a given application, the per-VNI level scaling decisions represent per-application decisions. In scenarios in which multiple VNIs are assigned for a given application, respective per-VNI scaling decisions can be made, at a sub-application granularity, for each of the VNIs.

As one skilled in the art will appreciate in light of this disclosure, certain embodiments may be capable of achieving various advantages, including some or all of the following: (a) providing desired levels of performance (such as response times and throughputs for application requests) for networking applications and services implemented using virtualized resources a cloud provider network in an efficient manner (e.g., using packet size statistics to select the appropriate number of FPNs), despite increases in application workload levels over time, and/or (b) reducing the likelihood of connection resets, packet drops, and other disruptions for cloud-based applications with very high request rates.

According to some embodiments, a system may comprise one or more CPSs of a PPS of a cloud provider network and a plurality of FPNs of the PPS. The FPNs may be configured to cache and execute packet rewriting rules (PRWs) for various networking applications. A CPS may assign a first VNI (VNI1) to receive packets of a first application App1 at the PPS, and a second VNI (VNI2) to receive packets of a second application App2 at the PPS. That is, a network address assigned to VNI1 may be utilized as a destination address of packets of App1 which are to be rewritten at the PPS, and a network address assigned to VNI2 may be utilized as a destination address of packets of App2 which are to be rewritten at the PPS.

The CPS may assign, to execute packet rewriting rules on packets of App1 received via VNI1, a first set of FPNs configured in multi-tenant mode in various embodiments. In accordance with the multi-tenant mode, an FPN of the first set may execute packet rewriting rules on packets of a plurality of applications including the App1 and App2. Note that in some cases, another set of FPNs which is assigned to App2 and VNI2 may overlap only partially with the first set of FPNs—there may be some FPNs which are used for App1 but not for App2, and/or there may be some FPNs which are used for App2 but not for App1.

In various embodiments, the CPS may obtain metrics from individual ones of the FPNs. The CPS may determine, based at least in part on analysis of a set of metrics obtained from the first set of FPNs, that a criterion for scaling up FPNs (increasing FPN capacity) has been satisfied by App1. In at least some cases the CPS may also determine that the criterion for scaling up FPNs has not been satisfied by other applications such as App2. As such, in at least some embodiments, scaling decisions may be made by a CPS on a per-application or a per-VNI basis.

Having determined that scaling up of FPN resources for App1 is required, the CPS may assign a second set of FPNs to execute packet rewriting rules on at least some additional packets of App1. The second set of FPNs may be configured in single-tenant mode in some embodiments, such that individual FPNs of the second set execute packet rewriting rules on packets of no other application than App1. In at least some embodiments, the number of FPNs included in the second set may be based at least on an average size of packets transmitted via VNI1. The average size may be indicated by the set of metrics obtained at the CPS—e.g., the metrics provided to the CPS may enable the CPS to compute the average size, or the average size may already be among the metrics obtained at the CPS.

In some embodiments, packet size statistics other than the average may be used—e.g., the variance or standard distribution may be used along with the average size.

After the assignment of the second set of FPNs to App1 and VNI1, the CPS may cause a packet rewriting rule to be executed on an additional packet of App1 at a particular FPN of the second set of FPNs in various embodiments. Packet rewriting rules of App2 and/or other applications which were being executed at the first set of FPNs may continue to be executed on additional packets at the first set of FPNs—that is, the CPS may cause a migration of processing of packet flows of App1 from the first set of FPNs to the second set, without necessarily migrating the processing of packet flows of other applications. To cause the migration, the CPS may take various actions such as modifying the configuration settings of VNI1 and/or EPNs that were assigned to App1 in some embodiments.

The CPS may continue to monitor the metrics of App1 packet flows after assigning the second set of FPNs to App1. More FPNs may be added (e.g., in single-tenant mode) to the second set if the analysis of the metrics indicates that still more FPN capacity is needed. Some FPNs that were included in the second set may be reassigned to other applications if the metrics indicate that App1's FPN capacity requirement is shrinking. In at least some embodiments in which the initial set of FPNs assigned to App1 and VNI1 was configured in multi-tenant mode and the second set of FPNs assigned to App1 (after App1's scale-up requirement is detected) was configured in single-tenant mode, the CPS may eventually move App1's traffic back to multi-tenant FPNs (e.g., if the App1 workload level is reduced in a sustained manner to close to the level prior to the detection of the scale up requirement).

According to some embodiments, as indicated above, FPNs and/or EPNs of the PPS may be implemented using compute instances or virtual machines of a virtualized computing service (VCS) of a cloud provider network. As such, the PPS may be considered an example of software defined networking (SDN). The packet processing operations performed at the PPS may be considered examples of network function virtualization (NFV) or virtualized network functions. An encapsulation protocol (e.g., a variant of the Generic Network Virtualization Encapsulation or Geneve protocol) may be used for communication between the various types of PPS nodes in some embodiments. In various embodiments, at least some of the sources and destinations whose traffic is processed at the PPS may also or instead comprise compute instances of the VCS. In some embodiments, some or all of the sources or destinations may comprise devices external to the provider network (e.g., devices located at premises of customers of the provider network). In various embodiments in which the VCS supports multiple categories of compute instances, such that a given category differs from other categories at least in respective resource or performance capacity (e.g., CPU capacity, memory capacity, storage capacity and the like), the decisions made by a CPS with regard to scaling up the FPNs or EPNs for a given VNI or application may include selecting the compute instance category for the additional FPNs or EPNs.

A number of factors may influence the decision regarding compute instance categories of the additional nodes when the FPN capacity of an application is scaled up in various embodiments. Such factors may include, for example, the rate at which traffic of the application under consideration is increasing, the category of compute instances which is currently being used for the application, the availability of compute instances of different categories in the locations (e.g., the data centers) at which the nodes are to be configured, preferences or constraints (e.g., including budget constraints) indicated by the application owners/administrators, and so on. The overall problem of scaling-related decision making is thus a multi-dimensional one, and tradeoffs among several of these kinds of factors may be taken into consideration by the PPS control plane when making the decisions. After selecting the category of compute instances at which an additional FPN is to be run for a given application, a CPS may request the VCS to launch a compute instance of the selected category, and then launch the programs implementing the FPN logic at that compute instance in various embodiments. The number of FPNs that are set up may depend on the category of compute instances selected by the CPS in some embodiments, and/or on the category of compute instances which were being used prior to the determination that additional FPNs are to be configured. In some cases in which compute instances of a category C1 were being used for the application prior to the scale up decision, compute instances of a different category C2 may be used for the new set of FPNs assigned to the application.

According to at least some embodiments, the PPS control plane may analyze the metrics collected for various packet flows of a given application, and make a determination as to whether the packet processing performance achieved for the application could be improved if the frame size limit (e.g., a maximum transmission unit) is increased. As discussed below in further detail, increasing the frame size may sometimes lead to increases in the maximum bandwidth that can be sustained at a given FPN. If the PPS is able to determine that increased performance could be achieved with a higher frame size, a recommendation may be provided to an application administrator to increase the frame size limit. Note that for some networking applications, it may not always be beneficial or even possible to increase frame size limits—e.g., routers or other intermediary networking devices of the public Internet may not support frame sizes greater than 1500 bytes for Ethernet packets. For private networks (such as networks implemented entirely within a given cloud computing environment, whose traffic does not have to pass through the public Internet), it may be possible to increase the frame size to so-called "Jumbo" frames (e.g., Ethernet maximum transmission units (MTUs) larger than the default limit of 1500 bytes).

As mentioned above, in some embodiments, an initial set of PPS nodes for an application may be configured in multi-tenant mode, and a CPS may configure a new set of nodes in single-tenant mode if a scale up criterion is met. In at least some embodiments, application administrators or owners may provide tenancy preferences to the PPS control plane, indicating for example whether they wish to use single-tenant nodes at one or more layers of the PPS from the beginning of the execution of the application, whether they wish to use multi-tenant nodes from the beginning and continue to use multi-tenant nodes even for scale up, and so on. The PPS control plane may configure the PPS nodes used for the corresponding applications in accordance with such preferences in various embodiments.

The PPS may provide a number of metrics to application owners or other PPS customers via programmatic interfaces (e.g., web-based consoles, command-line tools application programming interfaces (APIs), graphical user interfaces and the like) in different embodiments. Such metrics may, for example, indicate the rates at which packets are being processed, the request-response latencies for application requests, the number of nodes at various layers (and the tenancy of such nodes) that are being used for the application, the number of scale up and scale down related configuration changes performed by the PPS control plane, and so on.

In at least some embodiments, at least a subset of the nodes of the PPS may be configured within the same isolated virtual network of a VCS, enabling direct node-to-node communication without having to use resources or routes across IVNs. An isolated virtual network (IVN) may comprise a collection of networked resources (including, for example, compute instances used as PPS nodes) allocated to a given VCS client such as the PPS, which are logically isolated from resources allocated for other clients in other IVNs. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. An IVN may also be referred to as a virtual private cloud (VPC) in some embodiments.

In at least some embodiments, as indicated above, a PPS and/or a VCS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing nodes of a PPS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the PPS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources which are managed by the service. In one embodiment, as indicated above, each of the virtual compute instances may correspond to one of several instance categories, types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network, including a PPS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which techniques for per-virtual network interface scaling of nodes of a packet processing service may be implemented, according to at least some embodiments. As shown, system 100 includes respective collections or pools of nodes of a fast-path layer 141, a flow state tracking layer 142, and a rewriting decisions layer 143 of a multi-layer PPS 102. The flow state tracking layer and the rewriting decisions layers are collectively referred to as exception-path layers. The PPS 102, which may also be referred to as a network function virtualization service, may be used to rewrite data packets (e.g., by changing or adding headers to implement functionality such as load balancing, anycast, multicast and the like) flowing between traffic origin sets of various applications and traffic responder sets of the applications. For example, packets originating at traffic origin (TO) set 110A (comprising clients of an application App1) may be sent, after being rewritten at the PPS, to traffic responder (TR) set 111A, and packets originating at TO set 110B (which may include clients of a different application App2) may be sent via the PPS to TR set 111B. Virtual network interfaces such as VNIs 114A and 114B may be configured or established, e.g., by the PPS control plane servers 151, to receive packets from the TOs (that is, network addresses assigned to such VNIs may be used as destination addresses for packet sent by TOs such as TO 112A, TO 112J, TO 112K or TO 112Q); such VNIs may be referred to as ingress VNIs of the corresponding applications. A VNI is a logical entity with a set of networking and security-related attributes that can be programmatically attached to (or detached from) a compute instance or networking constructs such as logical load balancers or gateways. For example, at least one IP address can be assigned to a given VNI, and security rules restricting inbound and outbound traffic may be set for each VNI. In some cases, different VNIs such as VNIs 114C or 114D may be configured for transmitting the rewritten packets from the PPS to the TR sets (as such, network addresses of these VNIs may be used as the source addresses of packets sent from the PPS to TRs such as TR 113A or TR 113B); such VNIs may be referred to as egress VNIs of the applications. Note that for some applications, a given VNI may serve as both an ingress VNI and an egress VNI.

Fast-path layer 141 comprises a plurality of fast-path nodes (FPNs) 120A-120Z. A respective subset of the FPNs may be assigned by control plane servers (CPSs) 151 to apply rewriting rules to packet flows received via each ingress VNI (or sent from each egress VNI) of various applications such as App1 and App2. The nodes of the exception path layers may be organized into a set of isolated exception-path cells (IECs), such as IEC170A and IEC 170B, with each ingress VNI being assigned to a respective IEC. Flow state information pertaining to a particular packet flow may, during default modes of operation (e.g., during time periods when workload associated with that flow is not being migrated from one IEC to another), be generated, stored and replicated entirely within a single IEC, without requiring message to be exchanged across IEC boundaries. As such, during normal operations the EPNs of one IEC need not interact with the EPNs of any other IEC; hence the use of the term "isolated". In the scenario shown in FIG. 1, IEC 170A comprises flow state tracker nodes (FSTNs) 130A, 130B and 130C, as well as rewriting decisions nodes (RDNs) 140A and 140B, while IEC 170B comprises FSTNs 130K and 130L and RDN 140G. Isolating the EPNs into such cells may have several benefits, such as reducing the impact of failures, simplifying software upgrade rollouts, and so on.

In general, any desired number of nodes may be instantiated at any of the layers or tiers of the PPS, and subsets of the nodes at the different layers may be assigned to a given application (i.e., to a VNI used for an application). VNI-to-node mappings managers 152 running at PPS control plane servers 151 may generate and store mappings between VNIs and PPS nodes of the different layers. Scaling managers 153 running at the control plane servers may be responsible for determining (e.g., based on analysis of various kinds of metrics collected from the PPS nodes) if/when the packet processing capacity should be scaled up or down at a per-VNI granularity in the depicted embodiment. In at least some embodiments, factors such as measured data payload throughput (e.g., expressed in Gbps), packets-per-second, network connection establishments per second, statistics on packet size distribution and the like may be collected from the PPS nodes, or computed from raw data obtained from the PPS nodes, and used by scaling managers when making scaling decisions. Depending on the scaling decisions reached by the scaling manager, workload of a given VNI or application may be migrated from one set of PPS nodes to another, e.g., by workload migration managers 154. For example, in one embodiment, after a VNI is assigned as an ingress VNI to a given application by a CPS of the PPS, a set of FPNs may initially be assigned to that VNI and configured in multi-tenant mode (that is, at least some FPNs of that set of FPNs may be assigned to execute packet rewriting rules of other applications as well. A scaling manager 153 may analyze various metrics collected from those FPNs and make a scale-up decision which requires subsequent flows of that VNI to be processed in single-tenant mode on a different set of FPNs, with the number of FPNs to be included in the new set chosen based at least in part on packet size statistics obtained for the earlier flows of the VNI. The workload migration managers 154 may be responsible for initiating the configuration changes (e.g., at the EPNs being used for that VNI, and/or at the VNI itself) which cause the packets of the subsequent flows to be sent to the different set of FPNs. In some embodiments, additional packets of the flows which were already being processed at the time that the scaling decision is made may also be processed at the newly-configured set of FPNs.

In the embodiment depicted in FIG. 1, each of the PPS nodes at the different layers may maintain one or more caches, such as a cache containing packet rewriting rules (PRWs) to be applied to packets of different flows to transform the packets. Caches 121A of FPN 120A, caches 131A of FSTN 130A, and caches 141A of RDN 140A may be used for storing PRWs, for example. The cached information may enable faster processing of packet flows at the different layers. In some embodiments, at least some nodes at one or more of the layers may not maintain such caches.

The different layers 141, 142 and 143 may collectively be responsible for implementing a variety of packet rewriting rules or directives on behalf of numerous clients, with each such directive being applicable to one or more flows comprising respective pluralities of packets. From the perspective of the PPS, a packet flow may comprise some number of inbound packets (packets received at the PPS, also referred to as ingress packets) and a corresponding set of outbound packets (rewritten packets sent from the PPS, referred to as egress packets, after application-specific rules have been applied to the inbound packets). A given rewriting rule (also referred to as a rewriting directive) may for example contain or indicate one or more specific parameters or algorithms to be used to generate values for outbound packet headers which differ from the values of corresponding inbound packet headers, to generate multiple outbound rewritten packets corresponding to a single inbound packet, and so on. In the depicted embodiment, one packet flow may be distinguished from another based on some combination of the following attributes: the network protocol used at least for the packets received at the PPS, the source and destination addresses, the source and destination ports, an identifier of a virtual network interface used for transmitting or receiving the packets, and/or the direction in which the packets are transmitted with respect to an application on whose behalf the packets are to be processed. For example, one or more rewriting rules may be generated and enforced in the depicted embodiment for packets originating at traffic origin set 110A and directed towards a traffic responder set 111A. Similarly, a different rewriting rule may be implemented (e.g., concurrently with the rewriting rules being used for TO set 111A) for traffic originating at TO set 110B and directed to traffic responder set 111B. A traffic responder set 111 may, for example, comprise a set of back-end servers implementing a particular application (e.g., application App1 in the case of TR set 111A, and application App2 in the case of TR set 111B) using some set of resources of a provider network, and the traffic origins may represent client devices from which requests for that application are sent. An entity responsible for the application (e.g., a customer or client of a provider network at which the PPS is implemented) may submit a request indicating a particular type of packet processing requirement (e.g., a multicast requirement, an anycast requirement, a load balancing requirement, a source address substitution requirement, or the like) to the PPS 102, and one or more packet rewriting rules to fulfill the requirement may accordingly be generated by control plane servers 151 for corresponding flows of received packets. The packet processing requirement may be included in an application descriptor in one embodiment.

In some embodiments, respective packet rewriting rules may be generated for both directions of traffic flow between two sets of endpoints: e.g., one rule may be applied for packets originating at a traffic originator set 110 and directed towards a traffic responder set 111, and another rule may be applied for packets flowing from the responders back to the originators. In other embodiments, a given rewriting rule may contain respective elements or sub-rules for each direction of traffic. It is noted that in situations in which packets in both directions are transformed by the PPS, the roles of traffic "origins" and "responders" may be switched depending on the direction—e.g., when an entity or device receives a transformed packet from the PPS in the role of a responder, that same entity may subsequently send a packet to the PPS in the role of a traffic origin. In one embodiment, at least some of the PPS nodes used for packets transmitted in one direction (e.g., from a first set of hosts to a second set of hosts) may differ from the PPS nodes used for packets transmitted in the reverse direction (from the second set of hosts to the first set of hosts). For example, at least one node of the fast-path layer, the flow state tracking layer and/or the rewriting decisions layer which participates in the process of transforming and routing packets flowing in one direction may not necessarily be used for packets flowing in the reverse direction. In some embodiments, at least at one of the PPS layers, there may be no overlap between the respective fleets of nodes used for the different directions of traffic.

Two examples of the paths that may be taken when responding to a packet received at the fast-path layer are indicated in FIG. 1 to help explain the respective functions of the different layers. The arrows labeled "NF" (indicating a pathway of a new flow), e.g., NF-1, NF-2, and the like represent the operations and messages that may result when the first packet of a particular flow (i.e., a flow for which a packet rewriting rule has not yet been obtained at an FPN) is received at the PPS. From among the FPNs 120A-120Z, a particular subset (configured for example in multi-tenant mode) may be selected initially for a given client's packet processing requirement. One of the nodes from the subset (e.g., FPN 120C) may be selected for the first packet of a new packet flow originating at TO 112J and sent via a VNI 114A, as indicated by the arrow NF-1.

FPN 120C may examine its local caches, and determine that no entry applicable to the new flow exists in the caches (that is, a PRW applicable to the flow is not available at the FPN 120C). FPN 120C may then identify a particular FSTN 130B of IEC 170A to which a query indicating a cache miss is to be sent, as indicated by arrow NF-2. Within a given IEC, which may contain several FSTNs, a particular FSTN may be chosen as a destination for a query from an FPN using a flow hashing-based technique in various embodiments. The FPN to which an application packet is sent may be chosen using any of a number of techniques such as client-based partitioning, shuffle-sharding and/or flow hashing.

Upon receiving the cache miss indicator query NF-2, FSTN 130B may discover that it too does not have any indication of a PRW for the new flow, and may send a request for a PRW (e.g., the equivalent of its own cache miss) to a selected RDN 140B, as indicated by the arrow NF-3. RDN 140B may look up the details of the client requirement associated with the new flow (e.g., in a repository of mappings between packet source/destination addresses and packet processing requirements, by querying a control plane component of the service being used to implement the targeted application at the traffic responders, or using other techniques). RDN 140B may generate or obtain one or more PRWs corresponding to the requirement. The PRWs may indicate various characteristics of the packet or packets to be generated for each received packet of the new flow—e.g., how many packets are to be transmitted for each received packet, the networking protocol to be used for the transmitted packet or packets, the destination address/port, which address and port combination is to be used if the source address information of the received packets is to be changed, and so on.

In some implementations, the newly-generated PRW may be replicated at several RDNs for high availability; such replication is not shown in FIG. 1. As indicated by arrow NF-4, the RDN 140A may transmit the PRW back to FSTN 130B, where a local copy of the directive may also be stored in at least some embodiments. In at least some embodiments, a flow state entry for the new packet flow may be created/initialized and stored at the FSTN 130B, e.g., either upon receiving the query from the FPN 120C, or upon receiving the PRW from the RDN 140B. In various embodiments, the PRW may be replicated at multiple nodes of layer 142—e.g., FSTN 130B may cause the flow state information entry (which includes the PRW) of the new flow to be replicated at FSTN 130C (arrow NF-5). In the default or non-migration mode of operation, flow state information for the packet flows of a given application may be replicated at a plurality of FSTNs of a given IEC assigned to the application, but may not be replicated across IEC boundaries in such embodiments. In the depicted embodiment, the PRW may be transmitted from one of the FSTNs at which it was replicated to FPN 120C (arrow NF-6), where an entry representing the PRW may be stored in one of the FPN's local caches. The received PRW may then be implemented at FPN 120C: for example, the packet that led to the cache miss may be forwarded (NF-7) to a different FPN 120B, from where a transformed version (obtained by applying the PRW) may be transmitted to a selected destination (such as TR 113A via the EVNI as indicated by NF-8). The FPN 120B may be selected as a destination for forwarding the packet from FPN 120C because of a mapping between the EVNI indicated in the PRW and FPN 120B; that is, information about the EVNI may be used to select the FPN 120B. In some embodiments, a response to the transformed packet or packets may be received at the packet transformation layer (e.g., at FPN 120B or at a different FPN to which the response packet is directed from TR 113A). If transformations are required to the response packets, they may be applied (e.g., using one or more elements of the same PRW that was generated earlier in response to the cache miss, or using a different PRW) at layer 141, and the transformed response packets may be sent on to the traffic origin TO 112J.

The second example pathway illustrated in FIG. 1 is for a packet of an established flow—i.e., a flow for which a PRW and associated flow state information has already been generated and propagated to one or more nodes of layer 141 at which the PRW is to be applied. The arrows associated with this second flow are labeled EF (pathway for established flow). As indicated by EF-1, a packet of the established flow may be transmitted from a traffic origin 112K to FPN 120E (via one of the VNIs 114B). There, a PRW for the flow may be found in a local cache. In accordance with the cached PRW entry, the packet may be forwarded to a second FPN, FPN 120D in the depicted example (EF-2). One or more outbound packets corresponding to EF-1 may be generated, and send to a destination TR 113B as indicated by arrow EF-3 via a VNI 114D. If and when additional packets of the established flow are received at FPN 120E, the cached PRW may be reapplied, e.g., without further interactions with layers 142 or 143.

In at least some embodiments, the FPNs 120 may update metadata records corresponding to packets rewritten for various flows (e.g., indicating when the most recent packet of a given flow was processed as well as various other parameters discussed below in further detail) and transmit the contents of the metadata records (either in raw form, or in some compressed/aggregated form) to the FSTNs 130, as indicated by arrow 175A. Such metadata updates or refresh messages may be sent periodically in some implementations, e.g., once every K seconds, or in response to metadata update requests from layer 142. Such metadata refreshes may be among the events that trigger flow state information replications among nodes of the IEGs in some embodiments. Similarly, as indicated by arrow 175B, representations of flow state metadata records may be transmitted from layer 142 to layer 143 in at least some embodiments, and may be used at the RDNs to make various choices required for the rewriting rules (e.g., the particular port or IP address to be used as a substitute for a source port, or a particular destination server to which the transformed packets of a load-balanced flow should be sent). For example, updates flow metadata may indicate to an RDN that a particular (address, port) combination that was being used for a particular client's packet processing requirement is no longer in use because a connection has been closed, and that (address, port) pair may subsequently be used for some other packet processing requirement of the same client or another client. The metadata may also be stored as part of the flow state information and replicated in local caches at one or more layers of the PPS.

In the embodiment depicted in FIG. 1, the PPS 102 may implement one or more control plane programmatic interfaces (e.g., application programming interfaces (APIs), web-based consoles, command-line tools, graphical user interfaces (GUIs) and the like) which may be used by PPS customers/clients to indicate various types of packet processing requirements, scaling requirements and/or workload migration requirements. The nodes at the various layers of the flow management service may be implemented using virtual machines (e.g., compute instances hosted at a VCS) in some embodiments. In other embodiments, un-virtualized machines may be used.

Figure 2:
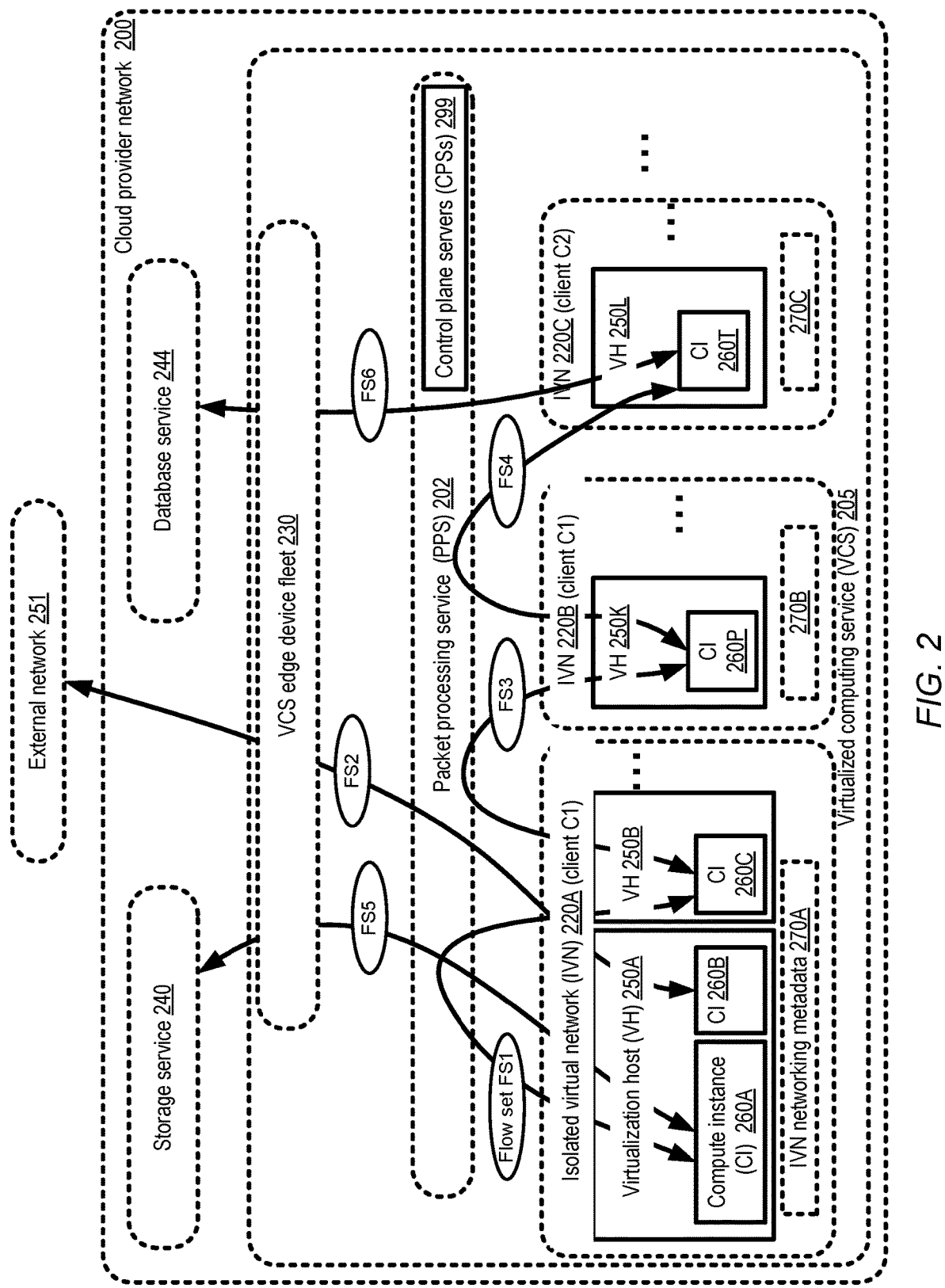
FIG. 2 illustrates examples of network flows for which automated scaling techniques may be implemented at a packet processing service of a provider network, according to at least some embodiments.

FIG. 2 illustrates examples of network flows for which automated scaling techniques may be implemented at a packet processing service of a provider network, according to at least some embodiments. Several different network-accessible services may be implemented at a cloud provider network 200 of FIG. 2, including, for example, a VCS 205, a storage service 240 and a database service 244. The VCS may comprise a plurality of virtualization hosts (VHs) 250, such as 250A, 250B, 250K and 250L in the depicted embodiment, at each of which one or more compute instances (CIs) 260 such as guest virtual machines (GVMs) may be instantiated on behalf of one or more VCS clients. Each virtualization host may also include other components not shown in FIG. 2, such as a virtualization management stack (VMS) comprising a hypervisor and/or an administrative-domain operating system, with the VMS acting as an intermediary between the CIs of the host and the hardware components of the host.

In the depicted embodiment, the VCS may support the capability of setting up isolated virtual networks (IVNs) on behalf of various clients. Each IVN 220 may include a respective subset of resources of the VCS, over whose networking configuration the client is granted substantial control. For example, IVN 220A (established for client C1) includes VHs 250A and 250B in the depicted embodiment, IVN 220B (also set up for client C1) includes VH 250K, and IVN 220C (set up for client C2) includes VH 250L. A given client such as C1 may establish multiple IVNs for various purposes—e.g., IVN 320A may be set up for hosting a web application for access from external networks such as network 251 (which may for example include portions of the public Internet and/or a client-owned network), while IVN 220B may be set up for the development of the web applications. Generally speaking, the VCS may allow the traffic associated with a given IVN to be isolated or separated from the traffic associated with any other IVN, unless of course the clients for whom the IVNs are established indicate otherwise. With respect to a given IVN, the client may make various networking decisions such as IP address assignment, subnet configuration and/or enforcement of security rules regarding incoming and outgoing traffic independently of the corresponding decisions made with respect to other IVNs. For example, a particular private IP address which is assigned to a CI 260B at VH 250A of IVN 220A may also happen be assigned to CI 260T at VH 250L of IVN 220C. Thus, with respect to many aspects of network management, each IVN may effectively be treated by the corresponding client as a standalone network such as one which may be established at the client's private data center. Each IVN may have an associated set of networking metadata 270 in the depicted embodiment, such as 270A for IVN 220A, 270B for IVN 220B, and 270C for IVN 270C. IVNs may also be referred to as virtual private clouds or VPCs in some environments.

In the embodiment depicted in FIG. 2, a PPS 202 similar in features and functionality to PPS 102 of FIG. 1 may be implemented at least in part for traffic originating at or directed to the CIs 260. PPS 202 may be referred to as a network function virtualization service, as the packet rewriting rules applied by it may represent virtualized network functions. The networking metadata 270 of an IVN may include addresses for the ingress and/or egress VNIs of PPS 202 for various packet processing requirements associated with the IVN in the depicted embodiment. For example, if source address substitution is to be implemented for packets originating at CIs of IVN 220A, in some embodiments a gateway for outbound traffic may be configured at IVN 220 specifically for those packets. The metadata 270A may include an indication of one or more IP addresses assigned to a VNI attached to the gateway, which may be mapped to one or more FPNs of PPS 202. Similarly, the IVN networking metadata may include indications of the interfaces and/or addresses of the VNIs of the PPS which are to be used for other types of packet processing applications, including multicast, anycast and the like.

Some types of packet transformations may be required for traffic originating and terminating within a given IVN, such as flow set FS1 which comprises packets flowing between different CIs of IVN 220A (e.g., 260A and 260C). Other types of transformations may be implemented with respect to flows (such as FS2) originating at external networks such as 250 and destined for CIs such as 260B within one or more IVNs as indicated by the arrow labeled FS2. For example, an application may be implemented at CI 260B, and client requests directed to that application may originate at various devices on the public Internet. Response to such requests may travel in the opposite direction—e.g., from CI 260B to the public Internet. Request packets as well as response packets may pass through the PPS 202 in the depicted embodiment. In at least some embodiments, a fleet of VCS edge devices 230 may be used as intermediaries between the VCS and other services or external networks 251. The VCS edge devices may be responsible for implementing an encapsulation protocol used at the VCS in some embodiments, e.g., for directing packets addressed to a particular CI 260 to a NIC (network interface card) associated with a virtualization management stack at the CI's virtualization host. The VCS edge devices and the virtualization management stacks at various virtualization hosts may both be considered examples of PPS client-side components in the depicted embodiment. In some embodiments, compute instances of the VCS may be established at data plane servers (sometimes referred to as "outpost" servers) located at premises external to the cloud provider network (e.g., customer premises), and traffic among such external compute instances and various provider network resources (e.g., resources of storage service 240, database service 244, and/or some IVNs) may also be managed using the PPS.

In some embodiments the PPS 202 may be used as a scalable and secure channel for traffic between IVNs. For example, flow set FS3 comprises packets transmitted between IVNs 220A and 220B of the same client C1 via PPS 202, while flow set FS3 comprises packets transmitted between the IVNs of two different clients (IVN 220B of client C1 and IVN 220C of client C2). The PPS may also be used for packet flows between different services of the provider network in some embodiments. For example, flow sets FS5 and FS6 between IVNs of the VCS and other services such as database service 244 or storage service 240 may be processed at PPS 202 in the depicted embodiment. It is noted that not all the CIs of the VCS may be assigned to clients of the VCS; some CIs may be used for internal purposes in various embodiments. In at least one embodiment, as mentioned earlier, some CIs may be used for the nodes at one or more layers of the PPS itself. In various embodiments, regardless of the specific types of sources and destinations of the network flows of a given application whose packets are rewritten at the PPS, metrics obtained at the PPS control plane servers 299 from the PPS noes assigned to the application may be analyzed and used to make scaling decisions. Such decisions may, for example, include determining (based at least in part on packet size statistics of the flows that have already been processed, or are currently being processed) the number of new PPS nodes to be configured at one or more layers of the PPS when scale up criteria are met by the application, the tenancy (e.g., single-tenancy versus multi-tenancy) of the new nodes, and so on.

Figure 3:
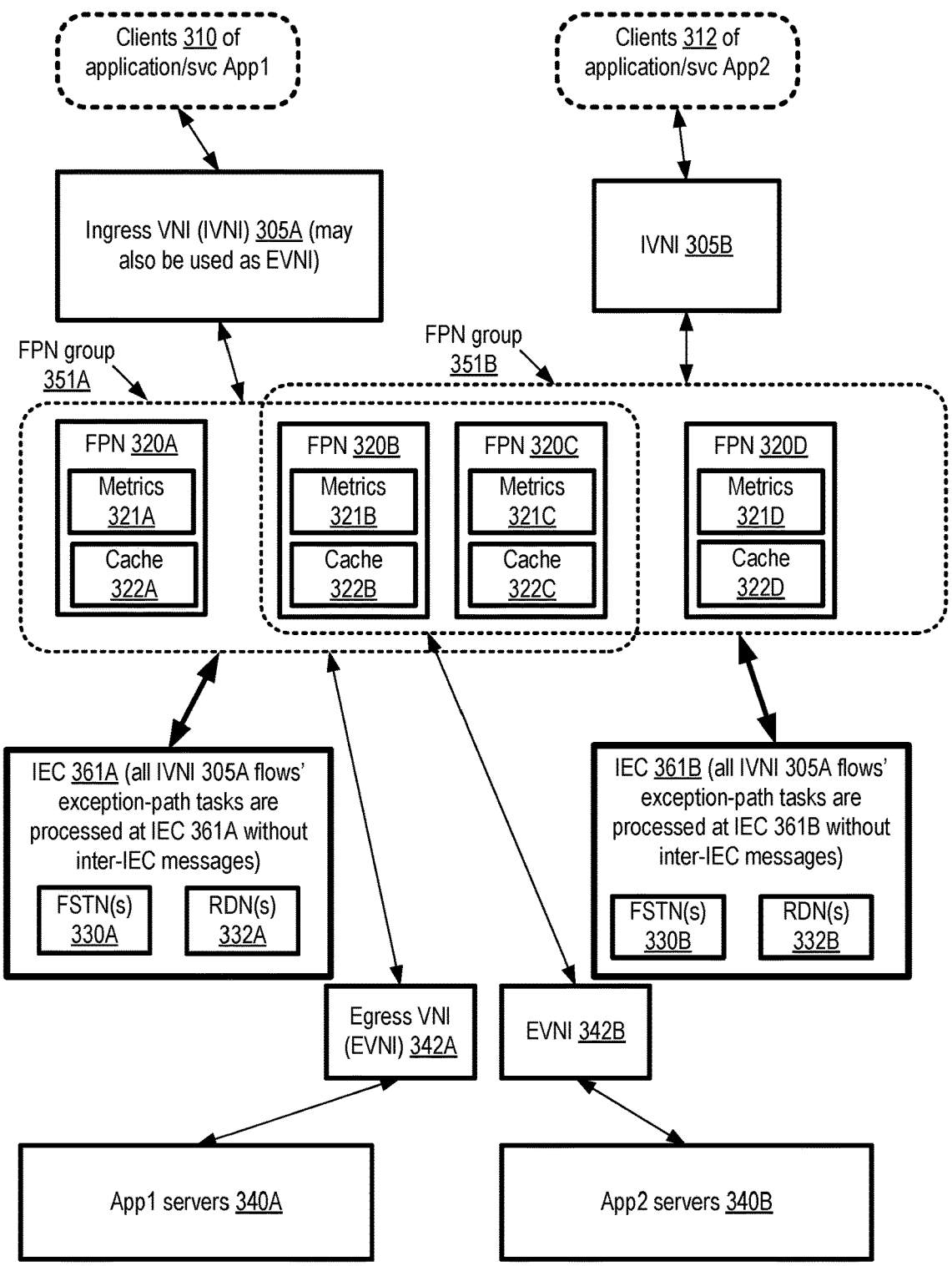
FIG. 3 illustrates an example of the use of ingress virtual network interfaces and egress virtual network interfaces for an application managed using a packet processing service, according to at least some embodiments.

FIG. 3 illustrates an example of the use of ingress virtual network interfaces and egress virtual network interfaces for an application managed using a packet processing service, according to at least some embodiments. In the embodiment depicted in FIG. 3, an ingress virtual network interface (IVNI) 305A has been configured as an endpoint for client requests of an application or service App1, which originate at clients 310, and another IVNI 305B has been configured for client requests of a different application or service App2, which originate at clients 312. The descriptor "ingress" may in general be applied to a VNI whose network address is used as a destination for requests for connection establishment (with a set of traffic destinations) which are sent from a set of traffic sources of an application such as App1 or App2 to a PPS of the kind introduced above, and for subsequent requests/messages sent via the connection. The direction of traffic flow originating at the sources that requested connection establishment (clients 310 in the example shown in FIG. 3) and ending at the destinations (App1 or App2 servers in the example shown in FIG. 3) may be referred to as the "forward" direction of the traffic herein, while the direction of traffic flow from the destinations to the sources may be referred to as the "reverse" direction. A VNI whose address is used as the source address for a packet being sent from the PPS may be referred to as the "egress" VNI or EVNI. In the example shown in FIG. 3, EVNI 342A is set up for outbound traffic to App1 servers 340A from the PPS, and EVNI 342B is set up for outbound traffic to App2 servers 340B from the PPS. In some cases (e.g., for some kinds of network address translations), a given VNI may be used as an IVNI as well as an EVNI for a given application.

A respective FPN group may be assigned to traffic received from each IVNI in the depicted embodiment. For example, FPN group 351A may be assigned to IVNI 305A, and FPN group 351B may be assigned to IVNI 305B. As shown, some FPNs may be assigned in multi-tenant mode to several FPN groups—e.g., FPN group 351A may include FPNs 320A, 320B, and 320C, while FPN group 351B may comprise FPN 320B, 320C, and 320D. Thus, members of two or more FPN groups may potentially be used for processing packets of a given IVNI in the depicted embodiment. Each FPN may store packet rewriting rules obtained from isolated exception-path cells (IECs) in caches 322, such as cache 322A, 322B, 322C or 322D. A number of different kinds of metrics 321 (e.g., metrics 321A, 321B, 321C and 321D) may be collected at the FPNs and provided to the PPS control plane where the metrics may be used to make scaling related decisions.

An IEC 261A has been selected (e.g., by the PPS control plane servers) for processing packets of App1 implemented at a set of servers 340A. IEC 361A comprises FSTN(s) 330A and RDN(s) 332A. Similarly, IEC 361B (comprising FSTN(s) 330B and RDN(s) 332B) has been assigned for processing packets of application or service App2, which is implemented at a different set of servers 340B. Nodes of only a single IEC may be used for processing packets received via a given IVNI during the default mode of operation of that IVNI in various embodiments. In at least some embodiments, the IECs may be configured in multi-tenant mode, in that traffic of multiple IVNIs may be processed at a given IEC. In one embodiment, multiple IVNIs may be assigned for a single application or service; each such IVNI may be assigned a respective FPN group and a respective IEC in such an embodiment. Each of the FPNs shown in FIG. 3 may be provided VNI-to-IEC mappings (VIMs) in the depicted embodiment, e.g., by the PPS control plane servers, enabling the FPNs to identify the specific IEC whose nodes are to be used for packets of various flows (whose headers indicate the VNIs), as well as for packets flowing in the reverse direction (e.g., from App1 servers or App2 servers to clients). In at least some embodiments, the VIMs may also be provided to FSTNs and/or RDNs by the PPS control plane.

Figure 4:
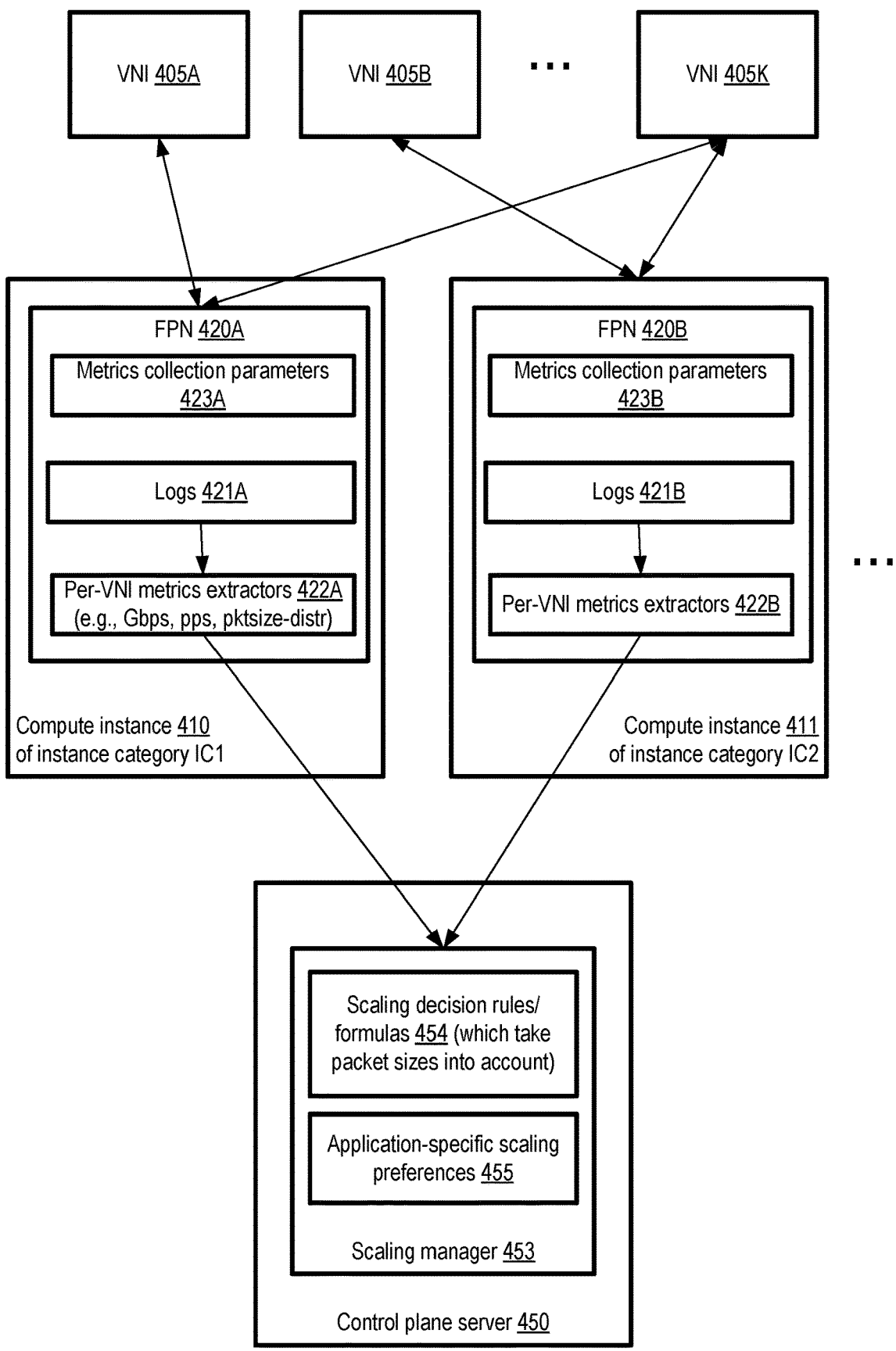
FIG. 4 illustrates an example of collection and analysis of sets of metrics associated with respective virtual network interfaces to make scaling decisions, according to at least some embodiments.

FIG. 4 illustrates an example of collection and analysis of sets of metrics associated with respective virtual network interfaces to make scaling decisions, according to at least some embodiments. In the example scenario shown in FIG. 4, a number of VNIs such as VNI 405A, VNI 405B and VNI 405K may be assigned by the PPS control plane as the ingress VNIs for a set of applications, and packets received via the VNIs 405 may be processed (i.e., packet rewriting rules generated by EPNs may be applied) at various FPNs including FPN 420A and FPN 420B. For example, packets may be received via VNI 405A and VNI 405K at FPN 420A, while packets may be received via VNI 405B and 405K at FPN 420B. The FPNs may each be implemented at a respective compute instance of a particular category of compute instances of a VCS of a cloud provider network in the depicted embodiment—e.g., FPN 420A may comprise one or more processes or threads running within a compute instance 410 of instance category IC1, while FPN 420B may comprise one or more processes or threads running within a compute instance 411 of instance category IC2. The compute instances of IC2 may differ in the available compute capacity (e.g., the number and/or types of VCPUs), memory capacity, storage capacity and/or other properties.

A respective collection of records indicative of various events and metadata associated with the received packets may be stored in one or more logs 421 at each FPN, such as logs 421A at FPN 420A and logs 421B at FPN 420B. The log records, which may each indicate the VNI with which a corresponding packet is associated, may indicate the timestamp of reception of a packet, timestamp of the transmission of a packet after it has been rewritten, the type of a received packets (as indicated in the case of the Transmission Control Protocol (TCP) by header flags including the SYN flag, the ACK flag, the FIN flag and the like)), the sizes of the packet data payload or the packet as a whole, and so on. In at least some embodiments, a given log may contain entries pertaining to multiple VNIs (assuming the FPN at which the log is stored is configured in multi-tenant mode).

From the raw content of the log records, per-VNI metrics extractors 422, such as per-VNI metrics extractors 422A at FPN 420A, and per-VNI metrics extractors 422B at FPN 420B, may compute a set of metrics aggregated at the VNI level in accordance with metrics collection parameters 423A or 423B, and provide the per-VNI metrics to a scaling manager 453 at a control plane server 450 of the PPS in the depicted embodiment. The set of metrics may indicate the rate at which data is being transferred for each VNI (expressed for example in gigabits per second or Gbps), the rate at which packets are being processed for each VNI (expressed for example in packets per second), the distribution (or aggregated statistics such as the mean) of packet size or packet payload size (expressed for example in bytes) for each VNI, the rate at which new connections are being established/closed via each VNI, and so on. The metrics collection parameters 423 may, for example, indicate the time periods over which the metrics are to be aggregated—e.g., whether the per-VNI metrics are to be computed for successive non-overlapping intervals of 10 seconds each, whether overlapping intervals are to be used for computing the per-VNI metrics, whether metrics are to be computed separately for each direction of packet flow or combined metrics for both directions (from a set of traffic origins, and to the set of traffic origins) are to be combined, and so on.

At the scaling manager 453, the collected per-VNI metrics from the different FPNs may be further aggregated (e.g., combining metrics associated with a given VNI from the different FPNS which were processing traffic of that VNI) and then analyzed to determine whether scale up or scale down decisions are warranted for any of the VNIs in the depicted embodiment. In at least some embodiments, the owners or administrators of different applications being implemented using the PPS may provide application-specific scaling preferences 455 via programmatic interfaces to the PPS control plane, indicating for example the threshold conditions or criteria for initiating scale up operations and/or scale down operations, and/or scaling decision rules/formulas 454 which can be used to compute the number of FPNs (and/or the tenancy levels) needed going forward for a particular VNI given the metrics. The formulas/rules may for example be used to decide whether bandwidth (e.g., in Gbps) or the packet rate (in packets per second) is the limiting factor in the current FPN node configuration for a given VNI, and to compute changes in FPN counts or types based on the identified limiting factor. In at least some embodiments, the scaling decision rules/formulas may take packet size statistics into account, e.g., in addition to other factors such as the rate of throughput change; as discussed below in the context of FIG. 5, packet sizes can impact the maximum bandwidth that can be sustained at an FPN. In some embodiments, the metrics provided from the FPNs to the scaling manager may include resource utilization levels, such as CPU utilization, memory utilization, storage utilization and the like, and these types of metrics (which may not necessarily be tied to individual VNIs) may also be taken into account by the scaling manager when making scaling decisions. In one embodiment, similar metrics may be collected from EPNs as well, provided to the scaling manager, and analyzed by the scaling manager to make scaling decisions about EPNs.

Figure 5:
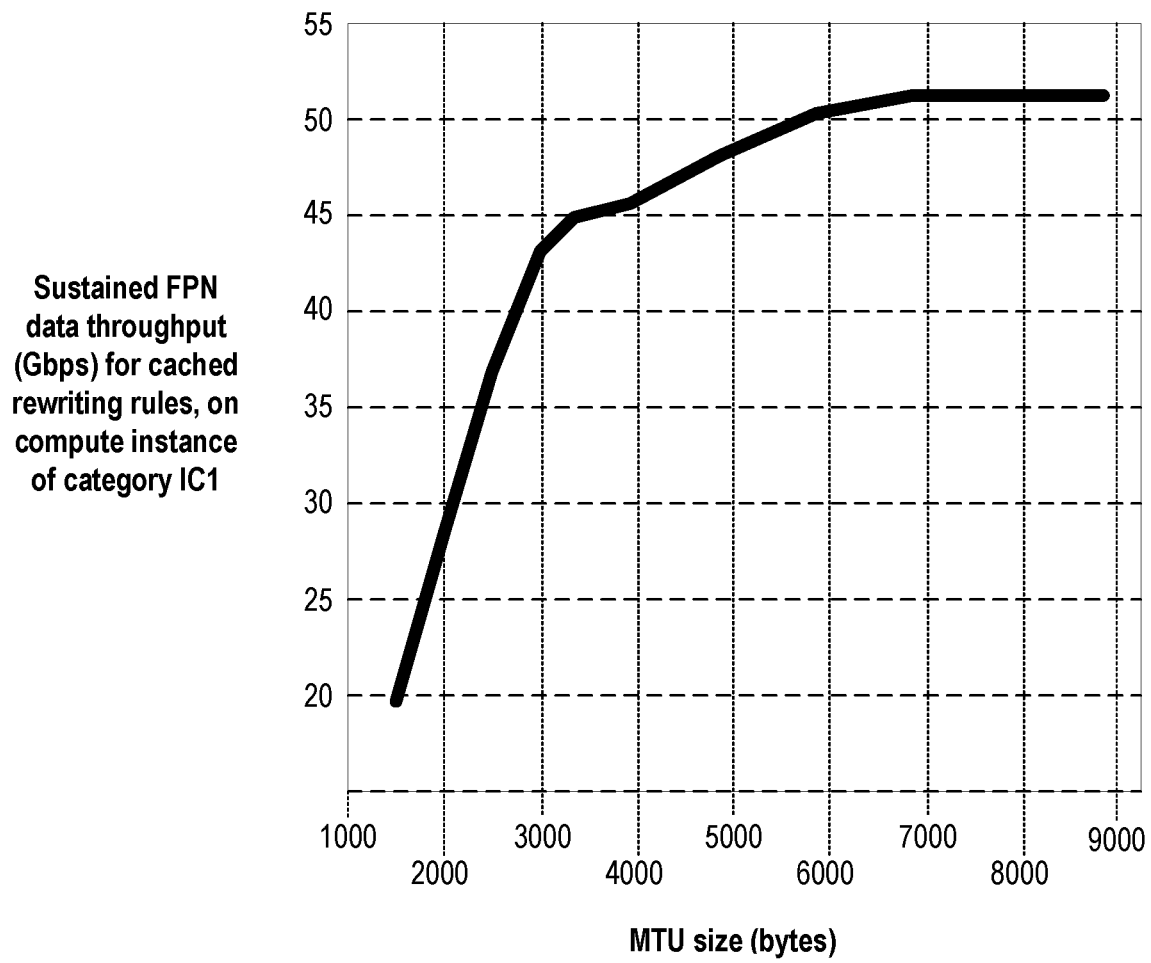
FIG. 5 illustrates an example of throughput increases which can be achieved at nodes of packet processing service as a result of increasing frame sizes, according to at least some embodiments.

FIG. 5 illustrates an example of throughput increases which can be achieved at nodes of packet processing service as a result of increasing frame sizes, according to at least some embodiments. Graph 502 illustrates the maximum data throughput (in Gbps shown along the Y axis) that can be sustained for applying cached rewriting rules at an FPN running on a compute instance of an instance category IC1, as a function of the MTU (maximum transmission unit) size (in bytes, shown along the X axis) of the received packets. Note that the curve indicating the bandwidth as a function of MTU size is intended to show general trends, and is not intended to illustrate results obtained from any specific compute instance category.

Traditionally, Ethernet frame sizes have been limited to approximately 1500 bytes (e.g., 1500 bytes for payload and a few bytes for headers/tags) for many applications in accordance with early Ethernet-related standards specifications from IEEE. Recently, the so-called "Jumbo" frames (which are larger than 1500 bytes) have been introduced in the industry, and some networking hardware manufacturers and software stack designers have provided support for transmitting such large frames. Many operating systems provide commands (such as the "ip" command in Linux-based operating systems) that can be used by administrators to set MTU sizes. For correct interoperability across networks that can potentially include devices from different vendors, the maximum frame sizes used are typically set no larger than the maximum frame size supported by any of the devices along the paths taken by the packets. Within a cloud provider network, such as cloud provider network 200 shown in FIG. 2, the operator of the provider network may ensure and/or verify that Jumbo frames are supported at the devices and links used for packet transmission within the network.

Performance test results, showing trends similar to those illustrated in graph 502, suggest that the maximum sustained data throughput can increase substantially, all other factors being kept equal, by increasing the frame size. This suggests that at least in some cases, when making scaling decisions to accommodate trends of increasing bandwidth of a given application or VNI, a scaling manager at a PPS control plane server may be able to select a smaller number of FPNs if the packet sizes used for the application are large, than of the packet sizes used for the application are small. For example, if the MTU size (and the actual packet size) is increased from approximately 1500 bytes to approximately 6000 or 7000 bytes, the maximum sustained data throughput can potentially be more than doubled using a given compute instance for an FPN. Accordingly, statistics on the packet sizes of the traffic associated with a given VNI may be taken into consideration by PPS scaling managers of the kind introduced above in at least some embodiments.

Figure 6:
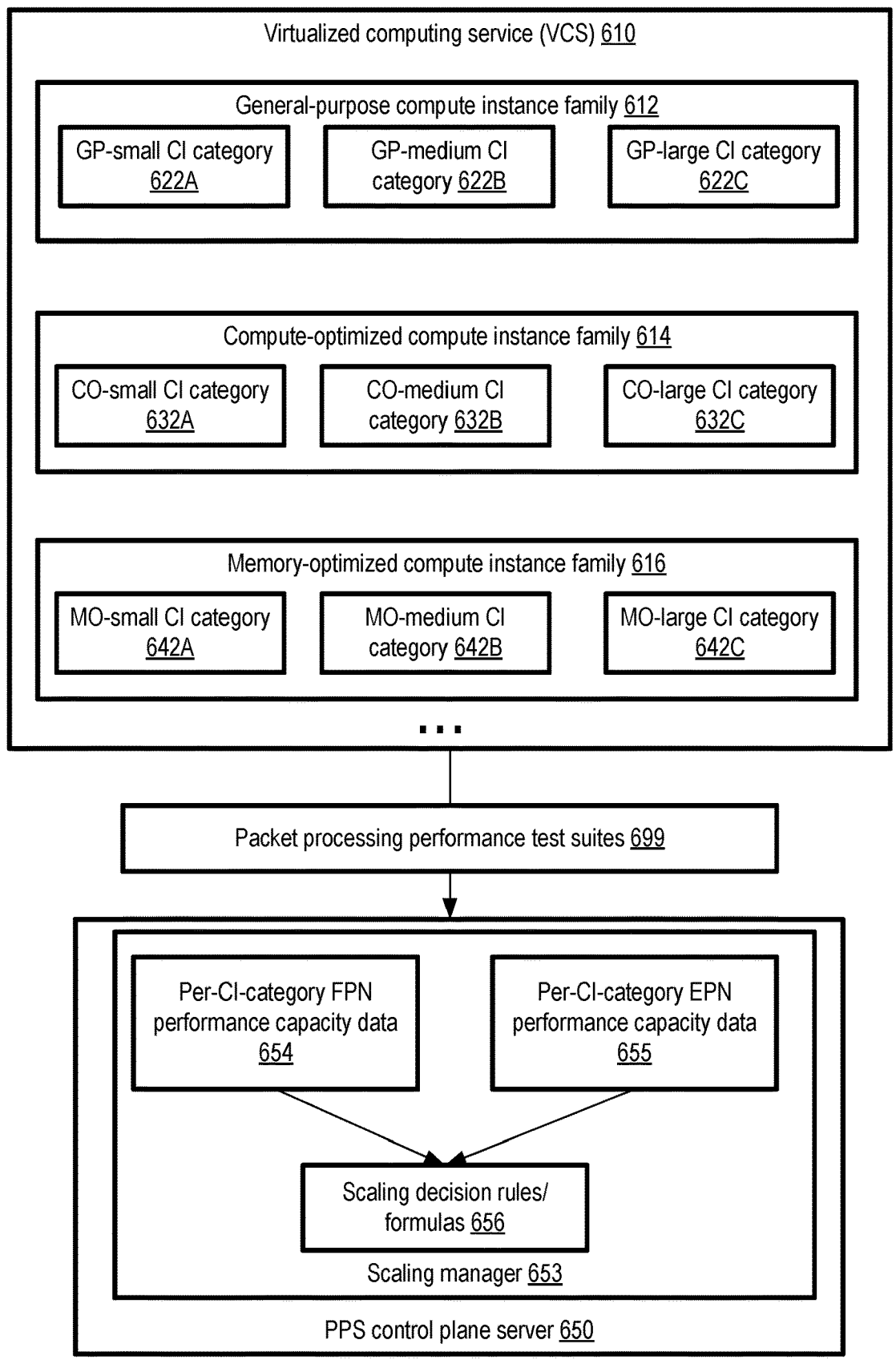
FIG. 6 illustrates an example use of compute instance category-specific performance data to make scaling decisions at a packet processing service, according to at least some embodiments.

FIG. 6 illustrates an example use of compute instance category-specific performance data to make scaling decisions at a packet processing service, according to at least some embodiments. In the embodiment depicted in FIG. 6, a VCS 610 of a cloud provider network may enable users (including the administrators of a PPS) to acquire compute instances of numerous categories, e.g., for implementing FPNs, EPNs or any desired application. The compute instance categories may themselves be grouped into instance families, such as a general-purpose compute instance family 612 (suitable for the majority of applications), a compute-optimized compute instance family 614 (suitable for applications in which CPUs typically become the bottleneck resource as the workload level is increased), or a memory-optimized compute instance family 616 (suitable for applications in which memory typically becomes the bottleneck resource as the workload level is increased).

Within each instance family, categories of compute instances that differ from one another in relative performance capacity may be defined. For example, general-purpose compute instance family 612 may include GP-small CI category 622A, GP-medium CI category 622B, and GP-large CI category 622C. Compute instances of the GP-large CI category may have greater computing capacity than compute instances of the GP-medium category, and compute instances of the GP-medium CI category may have greater computing capacity than compute instances of the GP-small category in the depicted embodiment. Similarly, compute-optimized compute instance family 614 may include CO-small CI category 632A, CO-medium CI category 632B, and CO-large CI category 632C, while memory-optimized compute instance family 616 may include MO-small CI category 642A, MO-medium CI category 642B, and MO-large CI category 642C. Other instance families and categories than those shown in FIG. 6 may also or instead be supported by the VCS in different embodiments.

In at least some embodiments, packet processing performance test suites 699 may be run on compute instances of various categories. The test suites may for example subject a compute instance of a given category to a stress test in which streams of packets (of varying packets sizes) belonging to respective network flows are sent to the compute instance, and programs implementing FPN and/or EPN logic are run at the compute instance to process the received packets. Based on the results of the test suites 699, per-CI-category FPN performance capacity data 654 and per-CI-category EPN performance capacity data 655 may be obtained by a scaling manager 653 of a PPS control plane server 650. The per-CI-category performance capacity data may, for example, indicate that for a given average packet size S1, an FPN running on a compute instance of a particular category Cat1 can sustain N1 Gbps and N2 packets per second without dropping any of the packets due to overloading, while an FPN running on a compute instance of a different category Cat2 can sustain N3 Gbps and N4 packets per second without dropping any of the packets due to overloading. Scaling decision rules/formulas 656 used by the scaling manager 653 may take the FPN and EPN performance capacity data into account, enabling the scaling manager to accurately estimate the number and category of compute instances that should be used for a given VNI's packet flows in different embodiments.

Figure 7:
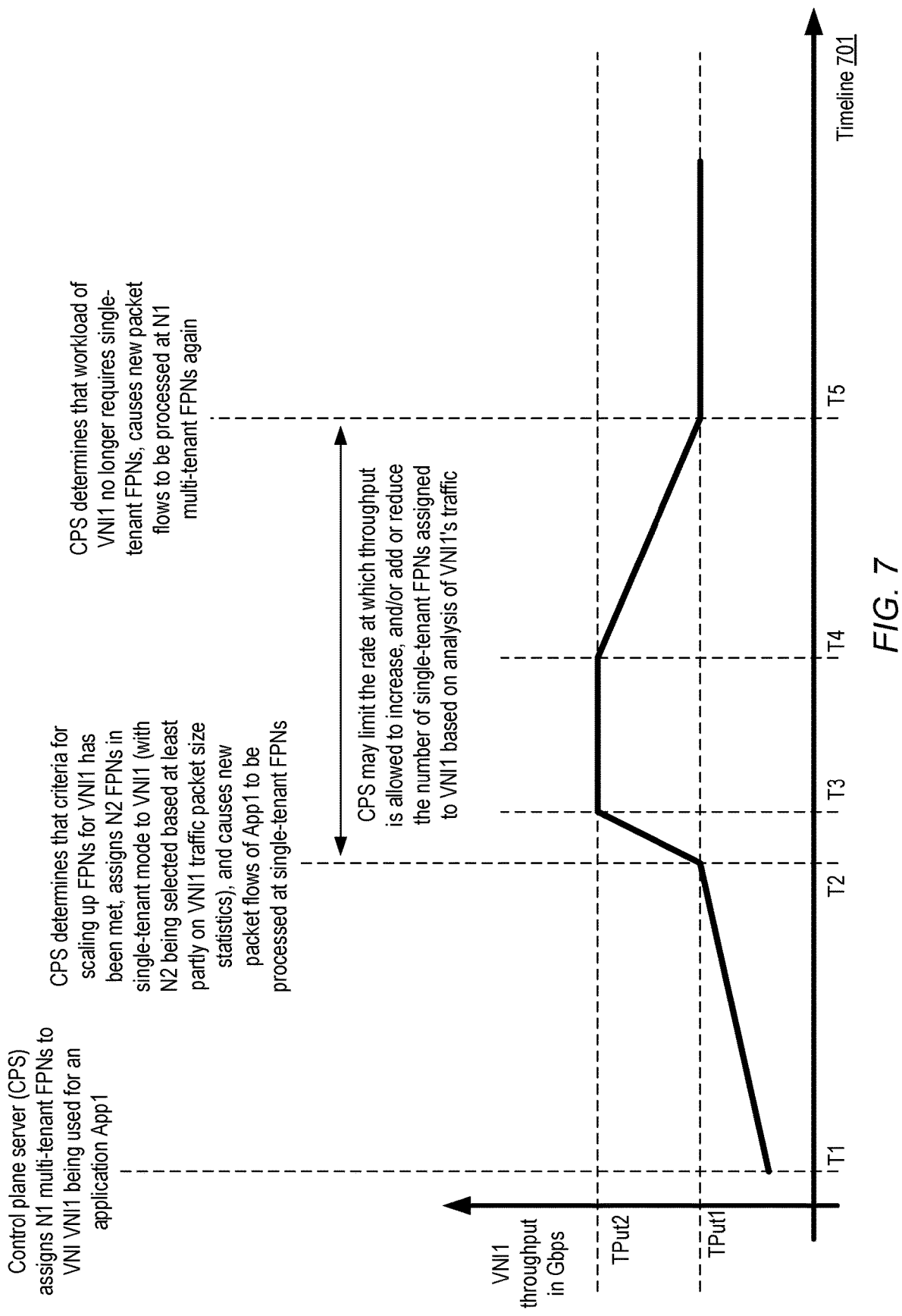
FIG. 7 illustrates an example timeline of events associated with scaling up fast-path nodes of a packet processing service, according to at least some embodiments.

FIG. 7 illustrates an example timeline of events associated with scaling up fast-path nodes of a packet processing service, according to at least some embodiments. In the example scenario shown in FIG. 7, a CPS of a packet processing service assigns N1 multi-tenant FPNs to execute rewriting rules on packets received via a VNI VNI1 of an application App1 at time T1 along timeline 701. The Y axis of the graph shown in FIG. 7 represents the throughput achieved at the PPS for packets received/sent via VNI1.

Between T1 and T2, the workload of packet flows of VNI1 gradually increases, until the measured throughput of the flows reaches TPut1 at T2. The CPS may analyze per-VNI metrics collected from the FPNs during the interval between T1 and T2, including metrics that indicate the average packet size or the distribution of packet sizes. At time T2, the CPS determines that criteria for scaling up FPNs for VNI1 has been met, and assigns N2 FPNs in single-tenant mode to VNI1. N2 may be selected, for example, based at least in part on packet size statistics of VNI1. The CPS may perform configuration changes (e.g., changing target FPN IP addresses of VNI1) to cause new packet flows of App1 to be processed at the N2 single-tenant FPNs in the depicted embodiment. In at least some embodiments, processing of packets of at least some flows that were already in progress at the time that the single-tenant N2 FPNs are assigned to VNI1 may also be migrated to the single-tenant N2 FPNs by the CPS (e.g., in part by causing flow state information of the pre-existing flows to be copied to the single-tenant FPNs from the multi-tenant FPNs). In other embodiments, processing of packets of at least some flows that were already in progress at the time that the single-tenant N2 FPNs are assigned to VNI1 may continue at the multi-tenant FPNs that were initially assigned to VNI1. In some embodiments, the CPS may limit the rate at which throughput is allowed to increase during the interval between T2 and T3. At T3, the throughput reaches TPut2 and remains at TPut2 until T4, at which point the throughput starts declining again (e.g., due to a decrease in the rate at which packets are generated at the traffic sources of App1). In at least some embodiments, the CPS may add more single-tenant FPNs to the set of FPNs assigned to VNI1, e.g., based on analysis of trends in FVNI1's traffic.

In at least one embodiment, if the workload level (as reflected in the throughput and/or packets per second measured at the single-tenant FPNs) steadily decreases, the CPS may make a decision that single-tenancy is no longer needed for the FPNs of VNI1, and that a criterion to start using multi-tenant nodes for VNI1 again has been met. Such a decision to revert to using multi-tenant FPNs may, for example, be made when the decreasing throughput has reached a threshold such as TPut1 at time T5 along timeline 701. The decision to revert to multi-tenant FPNs may represent an example of a scale down decision; other scale down decisions may include reducing the number of single-tenant FPNs. After determining that multi-tenant nodes are to be used again, a set of multi-tenant FPNs (which may in some cases include one or more of the same FPNs which were being used in the T1-to-T2 time interval) may again be assigned for executing packet rewriting rules of the application for which VNI1 was configured.

If the workload again begins to increase, single-tenant FPNs may again be allocated as needed in the depicted scenario. In some embodiments, when it make scale up (or scale down) decisions, the CPS may change not only the tenancy configuration of the FPNs assigned to VNI1, but also the category of compute instances used, e.g., based on the rate of change of workload levels and based on the per-category performance capacity data available to the CPS. In some embodiments, if an administrator of an application for which the PPS is being employed indicates preferences regarding tenancy of nodes at various layers of the PPS, those preferences may be implemented by the CPS—e.g., if the administrator indicates that single-tenant nodes are not to be used, the CPS may simply increase the size of the multi-tenant pool of FPNs as VNI1's workload increases. The CPS may also perform scale up and scale down changes for EPNs in some embodiments, e.g., based on analysis of connection establishment rates and the like.

Figure 8:
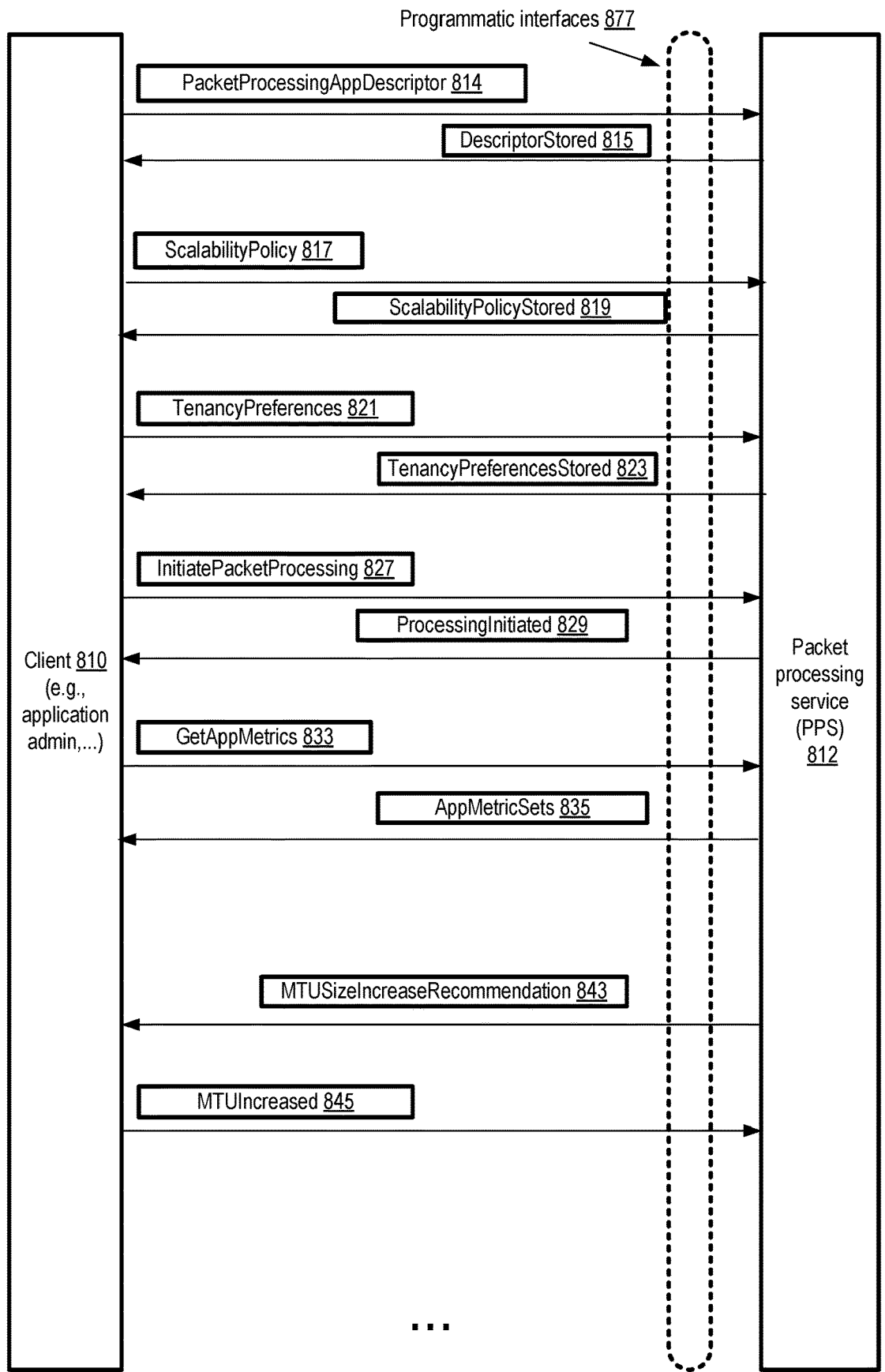
FIG. 8 illustrates example programmatic interactions between clients and a packet processing service, according to at least some embodiments.

FIG. 8 illustrates example programmatic interactions between clients and a packet processing service, according to at least some embodiments. A PPS 812, similar in features and functionality to PPS 102 of FIG. 1, may implement a set of programmatic interfaces 877 which can be utilized by clients 810 (such as administrators of applications whose packets are to be rewritten using the PPS) to submit requests and messages pertaining to their applications and receive corresponding responses. The programmatic interfaces 877 may, for example, include web-based consoles, command-line tools, graphical user interfaces, application programming interfaces and the like in different embodiments.

Using the programmatic interfaces, a client 810 may submit a PacketProcessingAppDescriptor message 814 comprising a descriptor indicating the type of packet processing (e.g., load balancing, multicast, network address translation, etc.) which is to be implemented at the PPS for the client's application, an initial anticipated workload level (expressed for example in packets/second and/or Gbps), desired performance levels (e.g., latencies for packet rewriting) and/or other characteristics of the application such as an expected temporal distribution of the workload. The PPS control plane may store the descriptor in a metadata repository and send a DescriptorStored response 815 to the client. In at least some embodiments, the sizes of initial sets of FPNs (e.g., configured in multi-tenant mode unless the client indicates a preference for single tenancy) and EPNs to be used for the application may be selected by a CPS of the PPS based on analysis of performance requirements and/or workload levels indicates in the descriptor. In some embodiments, a requested initial number of FPNs and/or EPNs may be indicated in the application descriptor.

A ScalabilityPolicy message 817 may be sent by a client in some embodiments, specifying a policy indicating the conditions under which scale up and/or scale down decisions for the FPNs or EPNs assigned to one or more VNIs of the application should be made by the PPS control plane. For example, a scalability policy submitted by the client may indicate that if a given VNI's throughput in Gbps remains over 80% of the anticipated throughput indicated in the application descriptor for a sustained period of T seconds, the PPS should configure FPNs in single-tenant mode for that VNI, with the number of FPNs being selected based on specified factors such as packet size statistics. Similar rules may be specified or EPN scaling decisions in some embodiments. The scalability policy may be stored in a metadata repository of the PPS control plane, and a ScalabilityPolicyStored message 819 may be sent to the client.

If the client wishes to utilize nodes configured in single-tenant mode only, or multi-tenant mode only, at one or more layers of the PPS, instead of letting the PPS control plane servers make tenancy decisions, such preferences may be indicated via one or more TenancyPreferences messages 821 in the depicted embodiment. The tenancy preferences may be stored at the PPS control plane, and a TenancyPreferencesStored message 823 may be sent to the client.

In some embodiments, an InitiatePacketProcessing request 827 may be sent to the PPS to indicate that the PPS nodes should expect to start receiving packets via the VNI(s) configured for the application, and should therefore start applying the rewriting rules in accordance with the packet processing requirements indicated in the application descriptor. In response, the PPS control plane may ensure that nodes at the various layers of the PPS are configured (in accordance with any tenancy preferences indicated by the client) to start accepting connections and processing the packets sent via the connections. A ProcessingInitiated message 829 may be sent to the client in some embodiments.

Various kinds of metrics pertaining to a client's application, such as the rates at which packets are being processed, the bandwidth used for the packets, the rates of packet drops (if any), the rates of connection establishment for transmitting packets of the application, the average duration of connections, the average number of packets sent in either direction per connection, statistics on the sizes of the packets, the change in the number and tenancy if FPNs or EPNs used for the application as a function of time, and so on, may be collected at the PPS in different embodiments. If the client wishes to obtain such metrics, a GetAppMetrics request 833 may be sent to the PPS in the depicted embodiment. The requested metrics may be sent to the client in at least some embodiments via one or more AppMetricSets messages 835. In some embodiments, the PPS control plane may analyze metrics such as the total amount of data transmitted over various connections of a given application, the distribution of the sizes of the packets/frames of the application, and so on, and be able to predict that the application is likely to be able to benefit (i.e., achieve better overall performance) from the use of larger frame size limits or MTUs. In one such embodiment, based at least in part on such analysis, the PPS may send an MTUSizeIncreaseRecommendation message 843 to the client, recommending an increase in the MTU size or frame size limit. If desired, the client may change MTU settings at one or more of the traffic sources/destinations of the application, and send an MTU-Increased message 845 to the PPS to inform the PPS that the MTU size increase recommendation has been received and adopted. In some embodiments, such recommendations may be provided only if the client has opted in to receive recommendations. If the client prefers, the recommendation may be adopted (or ignored) without sending a response to the PPS. It is noted that in some embodiments, programmatic interactions other than those shown in FIG. 8 may be supported by a PPS, and/or some of the interactions shown in FIG. 8 may not be supported.

Figure 9:
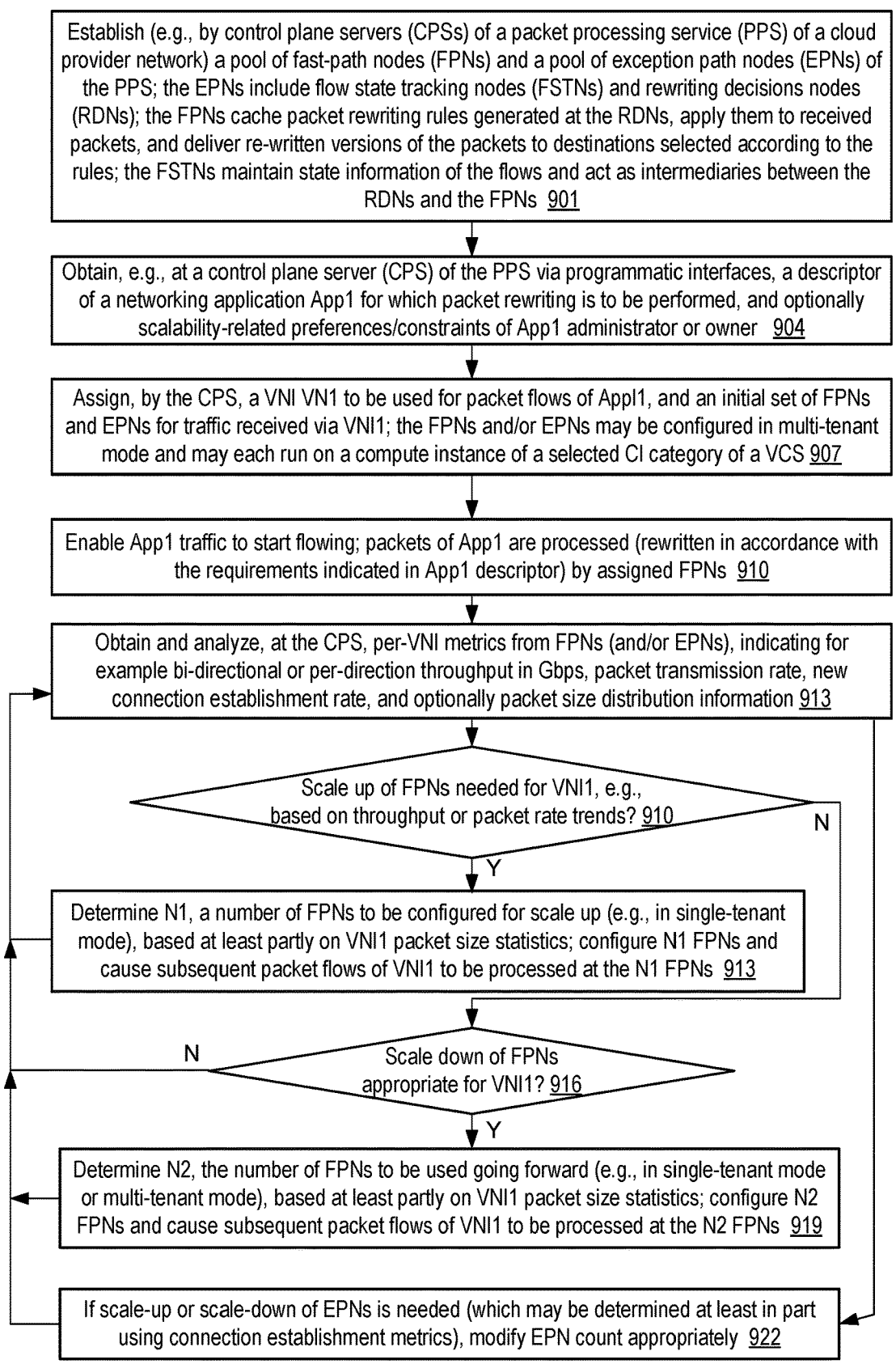
FIG. 9 is a flow diagram illustrating aspects of application scalability-related operations which may be performed a packet processing service, according to at least some embodiments.

FIG. 9 is a flow diagram illustrating aspects of application scalability-related operations which may be performed a packet processing service, according to at least some embodiments. As shown in element 901, a pool of FPNs and a pool of EPNs may be established at a PPS similar in features and functionality to PPS 102 of FIG. 1, e.g., by control plane servers (CPSs) of the PPS. The EPNs may include flow state tracking nodes (FSTNs) and rewriting decisions nodes (RDNs). The FPNs may cache packet rewriting rules generated at the RDNs, apply them to received packets, and deliver re-written versions of the packets to destinations selected according to the rules in various embodiments. The FSTNs may maintain state information of the flows and act as intermediaries between the RDNs and the FPNs.

A descriptor of a networking application App1 for which packet rewriting is to be performed may be obtained at a CPS of the PPS (element 904), e.g., from a client such as an administrator or owner of App1. The descriptor may indicate, for example, the kind of packet rewriting required, and/or a targeted performance level for an anticipated workload level. In some embodiments, the descriptor may also indicate scalability-related preferences or constraints of the client.

The CPS may assign a VNI VNI1 to be used for packet flows of App1, and an initial set of FPNs and EPNs for App1 traffic received via VNI1 (i.e., packets which indicate an address assigned to VNI1 as a destination address) in various embodiments (element 907). The FPNs and/or EPNs may be configured in multi-tenant mode by default in some embodiments; as such, a given multi-tenant FPN or EPN may process packets received via several different VNIs. The number of FPNs and/or EPNs to be used for VNI1 traffic may be chosen by the CPS based at least in part on the workload level expected for App1 and/or on performance targets indicated for App1 in one embodiment. In various embodiments, compute instances of one or more categories of a set of instance categories of a virtualized computing service (VCS) may be utilized to run FPNs and/or EPNs.

The flow of App1 traffic may be enabled in the depicted embodiment (element 910). Packets of App1 may be processed or rewritten in accordance with the rewriting requirements indicated in the App1 descriptor by the FPNs assigned to VNI1. The CPS may obtain and analyze various kinds of per-VNI metrics, collected at the FPNs and/or at the EPNs in some embodiments (element 913). The metrics may include, among others, bi-directional or per-direction throughput in Gbps, packet transmission rate in packets per second, new connection establishment rates, and optionally packet size distribution statistics. Based on the analysis of the metrics and/or or scalability preferences (if any) provided by the client, the CPS may make scale up or scale down decisions regarding the PPS nodes assigned to VNI1 (and VNIs assigned to other applications) in various embodiments.

If scale up of FPNs is required for VNI1, e.g., based on throughput and/or packet transmission rate trends (as determined in operations corresponding to element 910), the CPS may determine N1, the number of FPNs to be configured for scale up (element 913). N1 may be computed based at least in part on VNI1 packet size statistics (such as the average size of the packets transmitted in one or both directions via VNI1) in the depicted embodiment. In at least some embodiments, the N1 nodes may be configured in single-tenant mode (even if the initial set of FPNs used for VNI1 traffic were configured in multi-tenant mode). Subsequent packet flows of VNI1 may be processed at the N1 FPNs in the depicted embodiment. The CPS may then continue to obtain and analyze per-VNI metrics from the fleet of FPNs (element 913) and make additional scale up or scale down decisions as needed.

If the analysis of the metrics instead indicates that scale down of FPNs may be appropriate for VNI1 (as determined in operations corresponding to element 916), the CPS may determine N2, the number of FPNs to be used for VNI1 going forward (element 919). In some embodiments in which the current set of FPNs assigned to VNI1 is configured in single-tenant mode (after FPNs were initially configured for VNI1 in multi-tenant mode), the CPS may decide that criteria for reverting back to multi-tenant FPNs have been met, and start using multi-tenant FPNs again for VNI1. In other embodiments, a decision may be made to continue using FPNs in the same tenancy mode as those being used currently, and simply reduce the number of FPNs without changing tenancy. In various embodiments, N1 may be chosen based at least in part on packet size statistics of the VNI1 traffic. N2 FPNs may be configured or assigned for VNI1 if needed (or, in cases where the tenancy setting is not going to change, some of the current FPNs being used may simply be deployed for other applications). Subsequent packet flows of App1 may be handled by the N2 FPNs.

Some of the metrics analysis performed by the CPS may result in a decision to scale up (or scale down) the number of EPNs assigned to VNI1 in the depicted embodiment. Note that at least in some embodiments, different sets of metrics may be used to make scaling decisions for EPNs versus FPNs, since EPNs perform packet processing tasks relatively infrequently compared to FPNs. In one embodiment, for example, while FPN scaling decisions may be made based primarily on throughput, packet transmission rate and packet size metrics, EPN scaling decisions may be made based primarily on connection establishment rate metrics (since EPNs typically perform many of their tasks when the first packet of a flow is received, and fewer tasks for subsequent packets of the flow). If the CPS decides to scale up or down EPNs (element 922), the number of EPNs may be modified accordingly and used for subsequent traffic of VNI1. After operations corresponding to elements 913. 919 or 922 are performed, the CPS may resume collecting and analyzing metrics from the PPS nodes (element 913) in the depicted embodiment. It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Figure 10:
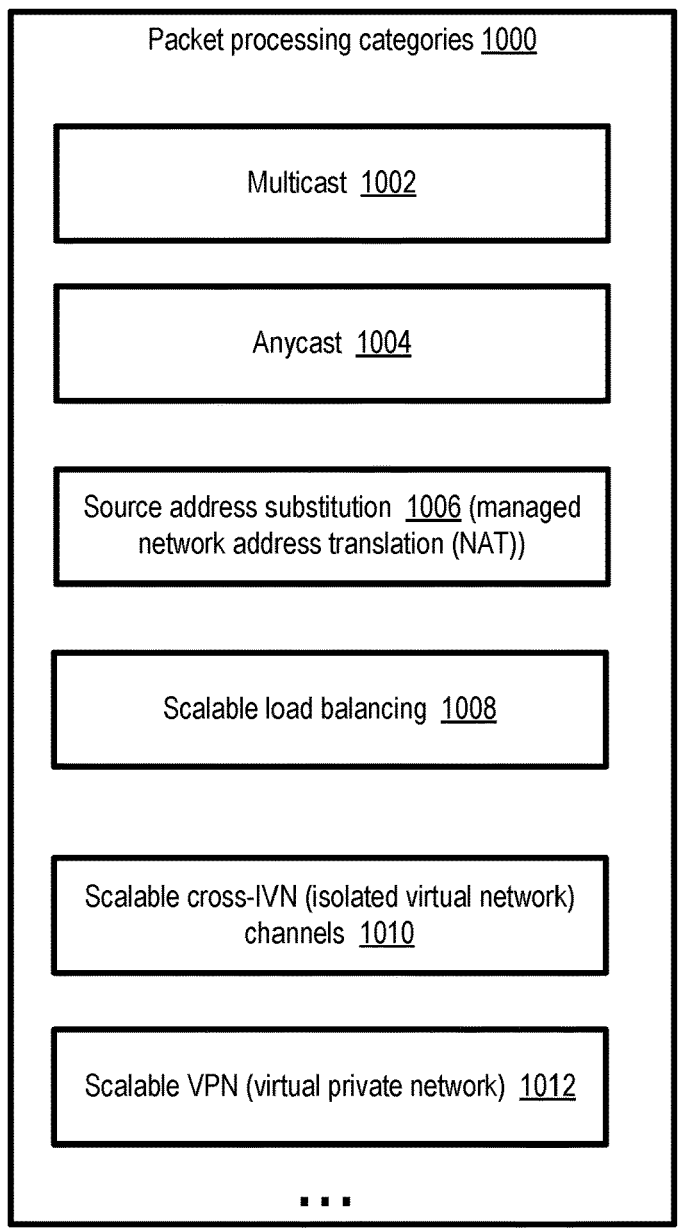
FIG. 10 illustrates example categories of packet processing that may be supported at a packet processing service of a cloud provider network, according to at least some embodiments.

FIG. 10 illustrates example categories of packet processing that may be supported at a packet processing service of a cloud provider network, according to at least some embodiments. As shown, the supported packet processing categories 1000 in the depicted embodiment may include, for example, multicast 1002, anycast 1004, source address substitution 1006 (which may also be referred to as managed network address translation (managed NAT)), scalable load balancing 1008, scalable cross-IVN channels 1010, scalable VPN (virtual private network) 1012 and the like. Other types of packet processing applications may be supported in various embodiments. In general, a PPS similar in features and functionality to PPS 102 of FIG. 1 may be configurable to implement any desired type of packet transformations, with nodes being assignable dynamically at each layer to support a large range of traffic rates in a transparent and scalable manner.

Generally speaking, multicast is a networking technique in which contents (e.g., the body) of a single packet sent from a source are replicated to multiple destinations of a specified multicast group. In contrast, stateful anycast may involve selecting, for all the packets of a given flow that are received at the PPS, a particular destination from among a specified set of destinations (e.g., regardless of workload level changes). Source address substitution, as the name suggests, involves replacing, for the packets of a particular flow, the source address and port in a consistent manner. Fixed-IP-address load balancing operations supported at a PPS may allow a particular IP address (e.g., an address assigned to an IVNI or an EVNI) to continue to be used as a load balancer address for an application, despite replacements of the virtual and/or physical machines being used for the load balancer.

In some embodiments, as indicated earlier, the PPS may be implemented at a provider network in which isolated virtual networks (IVNs) can be established. At least in some embodiments, by default the set of private network addresses set up within one IVN may not be accessible from another IVN. In various embodiments, the PPS may act as intermediary or channel between the private address spaces of two or more different IVNs, in effect setting up scalable and secure cross-IVN channels 1010. In at least some embodiments, the PPS may also or instead be used to support scalable VPN connectivity between some set of resources within a cloud provider network and one or more client networks or client premises outside the provider network.

Figure 11:
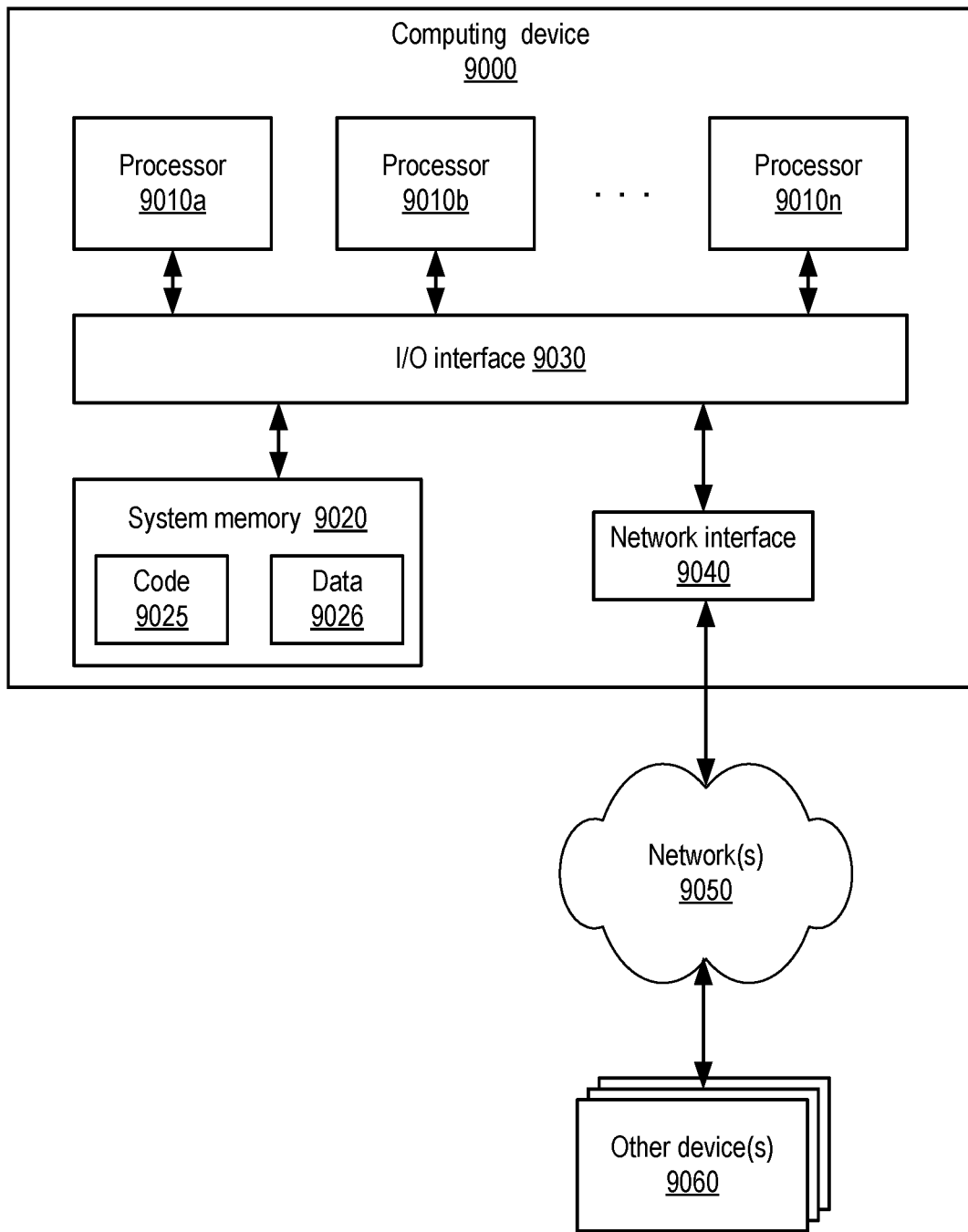
FIG. 11 is a block diagram illustrating an example computing device that may be used in at least some embodiments.

In at least some embodiments, a server that implements the types of techniques described herein (e.g., including functionality of PPS control plane servers, FPNs, FSTNs, RDNs and/or components of other provider network services), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  a control plane server of a packet processing service of a cloud computing environment; and
  a plurality of fast-path nodes of the packet processing service, wherein individual ones of the fast-path nodes are configured to execute packet rewriting rules on packets of one or more applications;
wherein the control plane server is configured to:
assign a first virtual network interface to receive packets of a first application at the packet processing service, wherein a first network address assigned to the first virtual network interface is utilized as a destination address of packets of the first application which are to be rewritten at the packet processing service;
assign, to execute packet rewriting rules on packets of the first application, a first set of fast-path nodes of the plurality of fast-path nodes, wherein the first set of fast-path nodes is configured in multi-tenant mode, wherein in accordance with the multi-tenant mode, a first fast-path node of the first set executes packet rewriting rules on packets of a plurality of applications including the first application and a second application, wherein a second network address assigned to a second virtual network interface is utilized as a destination address of packets of the second application which are to be rewritten at the packet processing service;
determine, based at least in part on analysis of a set of metrics obtained from the first set of fast-path nodes, that a criterion for scaling up fast-path nodes has been satisfied by the first application, and that the criterion for scaling up fast-path nodes has not been satisfied by the second application;
assign, to execute packet rewriting rules on at least some additional packets of the first application, a second set of fast-path nodes configured in single-tenant mode, such that individual fast-path nodes of the second set execute packet rewriting rules on packets of no other application than the first application, wherein the number of fast-path nodes included in the second set is based at least on an average size of packets transmitted via the first virtual network interface, and wherein the average size is indicated by the set of metrics; and
cause, after assignment of the second set of fast-path nodes, (a) a packet rewriting rule to be executed on an additional packet of the first application at a particular fast-path node of the second set of fast-path nodes and (b) a packet rewriting rule to be executed on an additional packet of the second application at a particular fast-path node of the first set of fast-path nodes.

2. The system as recited in claim 1, wherein the control plane server is further configured to:
cause a compute instance of a particular category of a plurality of categories of compute instances of a virtualized computing service to be launched, wherein a performance capacity of a compute instance of the particular category differs from a performance capacity of a compute instance of another category of the plurality of categories; and
cause a particular node of the second set of fast-path nodes to be run at the compute instance.

3. The system as recited in claim 2, wherein the control plane server is further configured to:
obtain an indication of a first category of the plurality of categories of a first compute instance at which a first node of the first set of fast-path nodes runs, wherein the number of fast-path nodes included in the second set of fast-path nodes is based at least in part on the first category.

4. The system as recited in claim 3, wherein the particular category differs from the first category.

5. The system as recited in claim 1, wherein the control plane server is further configured to:
determine, based at least in part on analysis of an additional set of metrics obtained from the second set of fast-path nodes, that a criterion for reverting to using fast-path nodes in multi-tenant mode has been satisfied by the first application; and
cause a fast-path node of the first set of fast-path nodes to execute a packet rewriting rule on another packet of the first application.

6. A computer-implemented method, comprising:
configuring a first virtual network interface to receive packets of a first application at a packet processing service, wherein a first network address assigned to the first virtual network interface is utilized as a destination address of packets of the first application which are to be rewritten at the packet processing service;
assigning, to execute packet rewriting rules on packets of the first application, a first set of fast-path nodes of a plurality of fast-path nodes of the packet processing service;
determining, based at least in part on analysis of a set of metrics obtained from the first set of fast-path nodes, that a criterion for scaling up fast-path nodes has been satisfied by the first application; and
assigning, to execute packet rewriting rules on at least some additional packets of the first application, a second set of fast-path nodes, wherein the number of fast-path nodes included in the second set is based at least in part on a statistic of the size of packets transmitted via the first virtual network interface, and wherein the statistic is indicated by the set of metrics.

7. The computer-implemented method as recited in claim 6, further comprising:
launching a compute instance of a particular category of a plurality of categories of compute instances of a virtualized computing service, wherein a performance capacity of a compute instance of the particular category differs from a performance capacity of a compute instance of another category of the plurality of categories; and
launching a particular node of the second set of fast-path nodes at the compute instance.

8. The computer-implemented method as recited in claim 7, the computer-implemented method further comprising:
obtaining an indication of a first category of the plurality of categories of a first compute instance at which a first node of the first set of fast-path nodes runs, wherein the number of fast-path nodes included in the second set of fast-path nodes is based at least in part on the first category.

9. The computer-implemented method as recited in claim 8, wherein the particular category differs from the first category.

10. The computer-implemented method as recited in claim 6, further comprising:
providing, via a programmatic interface, based at least in part on analysis of the set of metrics, a recommendation to increase a frame size limit of packets of the first application.

11. The computer-implemented method as recited in claim 6, further comprising:
configuring the first set of fast-path nodes in multi-tenant mode, wherein in accordance with the multi-tenant mode, a first fast-path node of the first set executes packet rewriting rules on packets of a plurality of applications including the first application and a second application, wherein a second network address assigned to a second virtual network interface is utilized as a destination address of packets of the second application which are to be rewritten at the packet processing service.

12. The computer-implemented method as recited in claim 11, further comprising:
configuring the second set of fast-path nodes in single-tenant mode, wherein in accordance with the single-tenant mode, a second fast-path node of the second set of fast-path nodes executes packet rewriting rules on packets of no other application than the first application.

13. The computer-implemented method as recited in claim 11, further comprising:
receiving, via a programmatic interface, an indication of a tenancy preference for nodes assigned to the first application; and
selecting a tenancy mode for fast-path nodes of the second set based at least in part on the tenancy preference.

14. The computer-implemented method as recited in claim 6, further comprising:
assigning a first set of exception-path nodes of the packet processing service to the first application, wherein the first set of exception-path nodes includes a flow state tracking node and a rewriting decisions node, wherein the flow state tracking node is configured to store flow state information of packet flows of the first application, and wherein the rewriting decisions node is configured to generate packet rewriting rules of the first application which are cached and executed at fast-path nodes; and
in response to determining, based at least in part on analysis of a particular metric of the first application, that a criterion for scaling up exception-path nodes of the first application has been met, assigning at least one additional exception-path node to the first application.

15. The computer-implemented method as recited in claim 14, wherein the particular metric comprises a rate at which network connections are established for transmitting packets of the first application.

16. A non-transitory computer-accessible storage medium storing program instructions that when executed on a processor:
configure a virtual network interface to receive packets of an application at a packet processing service, wherein a network address assigned to the virtual network interface is utilized as a destination address of packets of the application which are to be rewritten at the packet processing service;
assign, to execute packet rewriting rules on packets of the application which are received via the virtual network interface, a first set of fast-path nodes of a plurality of fast-path nodes of the packet processing service;

determine, based at least in part on analysis of a set of metrics obtained from the first set of fast-path nodes, that a criterion for scaling up fast-path nodes has been satisfied by the first application; and
assign, to execute packet rewriting rules on at least some additional packets of the application, a second set of fast-path nodes, wherein the number of fast-path nodes included in the second set is based at least in part on a statistic of the size of packets transmitted via the virtual network interface, and wherein the statistic is indicated by the set of metrics.

17. The non-transitory computer-accessible storage medium as recited in claim 16, storing further program instructions that when executed on the processor:
cause a compute instance of a particular category of a plurality of categories of compute instances of a virtualized computing service to be launched, wherein a performance capacity of a compute instance of the particular category differs from a performance capacity of a compute instance of another category of the plurality of categories; and
launch a particular fast-path node of the second set of fast-path nodes at the compute instance.

18. The non-transitory computer-accessible storage medium as recited in claim 17, storing further program instructions that when executed on the processor:
obtain an indication of a first category of the plurality of categories of a first compute instance at which a first fast-path node of the first set of fast-path nodes runs, wherein the number of fast-path nodes included in the second set of fast-path nodes is based at least in part on the first category.

19. The non-transitory computer-accessible storage medium as recited in claim 18, wherein the particular category differs from the first category.

20. The non-transitory computer-accessible storage medium as recited in claim 16, storing further program instructions that when executed on the processor:
assign a set of exception-path nodes of a plurality of exception-path nodes of the packet processing service to the application, wherein the set of exception-path nodes includes a flow state tracking node and a rewriting decisions node, wherein the flow state tracking node is configured to store flow state information of packet flows of the application, and wherein the rewriting decisions node is configured to generate packet rewriting rules of the application which are cached and executed at fast-path nodes; and
in response to determining, based at least in part on analysis of a particular metric of the application, that a criterion for scaling up exception-path nodes of the application has been met, assign at least one additional exception-path node to the application.

\* \* \* \* \*